US012579724B2

(12) United States Patent
Zhou

(10) Patent No.: US 12,579,724 B2
(45) Date of Patent: Mar. 17, 2026

(54) EXPRESSION GENERATION METHOD AND APPARATUS, DEVICE, AND MEDIUM

(71) Applicant: TENCENT TECHNOLOGY (SHENZHEN) COMPANY LIMITED, Shenzhen (CN)

(72) Inventor: Zhiqiang Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 341 days.

(21) Appl. No.: 18/331,906

(22) Filed: Jun. 8, 2023

(65) Prior Publication Data

US 2023/0316623 A1     Oct. 5, 2023

Related U.S. Application Data

(63) Continuation of application No. PCT/CN2022/126077, filed on Oct. 19, 2022.

(30) Foreign Application Priority Data

Dec. 6, 2021     (CN) .......................... 202111473341.7

(51) Int. Cl.
*G06T 13/40*     (2011.01)
*G06T 17/20*     (2006.01)
*G06V 40/16*     (2022.01)

(52) U.S. Cl.
CPC .............. *G06T 13/40* (2013.01); *G06T 17/20* (2013.01); *G06V 40/171* (2022.01)

(58) Field of Classification Search
None
See application file for complete search history.

(56) References Cited

U.S. PATENT DOCUMENTS 11,423,692 B1 * 8/2022 Albuz .................. G06N 3/0464
2008/0037836 A1 * 2/2008 Chen .................... G06V 40/176
382/103

(Continued)

FOREIGN PATENT DOCUMENTS

CN     103854306 A     6/2014
CN     108257162 A     7/2018

(Continued)

OTHER PUBLICATIONS

The World Intellectual Property Organization (WIPO) International Search Report for PCT/CN2022/126077 Jan. 12, 2023 6 Pages (including translation).

(Continued)

*Primary Examiner* — Hilina K Demeter
(74) *Attorney, Agent, or Firm* — Anova Law Group, PLLC

(57) ABSTRACT

An expression generation method includes: acquiring expression location difference information of a key facial point of a real face in a first expression and a second expression; acquiring an initial virtual key facial point of a virtual face in the first expression; obtaining a target virtual key facial point of the virtual face in the second expression based on the expression location difference information and the initial virtual key facial point; extracting a key point distribution feature based on the target virtual key facial point, and determining, based on the key point distribution feature, a target control parameter for controlling associated vertex in a face mesh of the virtual face and related to the second expression; and controlling the associated vertex in the face mesh to move based on the target control parameter to generate the second expression in the virtual face.

19 Claims, 15 Drawing Sheets

(56)          References Cited

U.S. PATENT DOCUMENTS

| | | | |
|---|---|---|---|
| 2018/0189553 A1* | 7/2018 | Guo ..................... | G06V 40/168 |
| 2018/0249200 A1* | 8/2018 | Wang ................. | H04N 21/4788 |
| 2018/0373924 A1* | 12/2018 | Yoo ..................... | G06V 10/454 |
| 2019/0325633 A1 | 10/2019 | Miller, IV et al. | |
| 2020/0058171 A1* | 2/2020 | Du ..................... | G06F 3/04845 |
| 2020/0090394 A1* | 3/2020 | Hong ..................... | G06F 17/18 |
| 2021/0042507 A1* | 2/2021 | Raviv .................. | G06V 40/165 |
| 2021/0049350 A1* | 2/2021 | Wu ..................... | G06V 10/443 |
| 2021/0056747 A1* | 2/2021 | Hefny ................... | G06V 40/16 |
| 2021/0097730 A1* | 4/2021 | Theobald .............. | G06N 3/094 |

FOREIGN PATENT DOCUMENTS

| | | | |
|---|---|---|---|
| CN | 109087380 A | 12/2018 | |
| CN | 109147024 A | 1/2019 | |
| CN | 109410298 A | 3/2019 | |
| CN | 111632374 A | 9/2020 | |
| CN | 112766027 A | 5/2021 | |
| CN | 113870401 A | 12/2021 | |

OTHER PUBLICATIONS

The State Intellectual Property Office of the People's Republic of China (SIPO) Office Action 1 for 202111473341.7 Jan. 12, 2022 11 Pages (including translation).

* cited by examiner

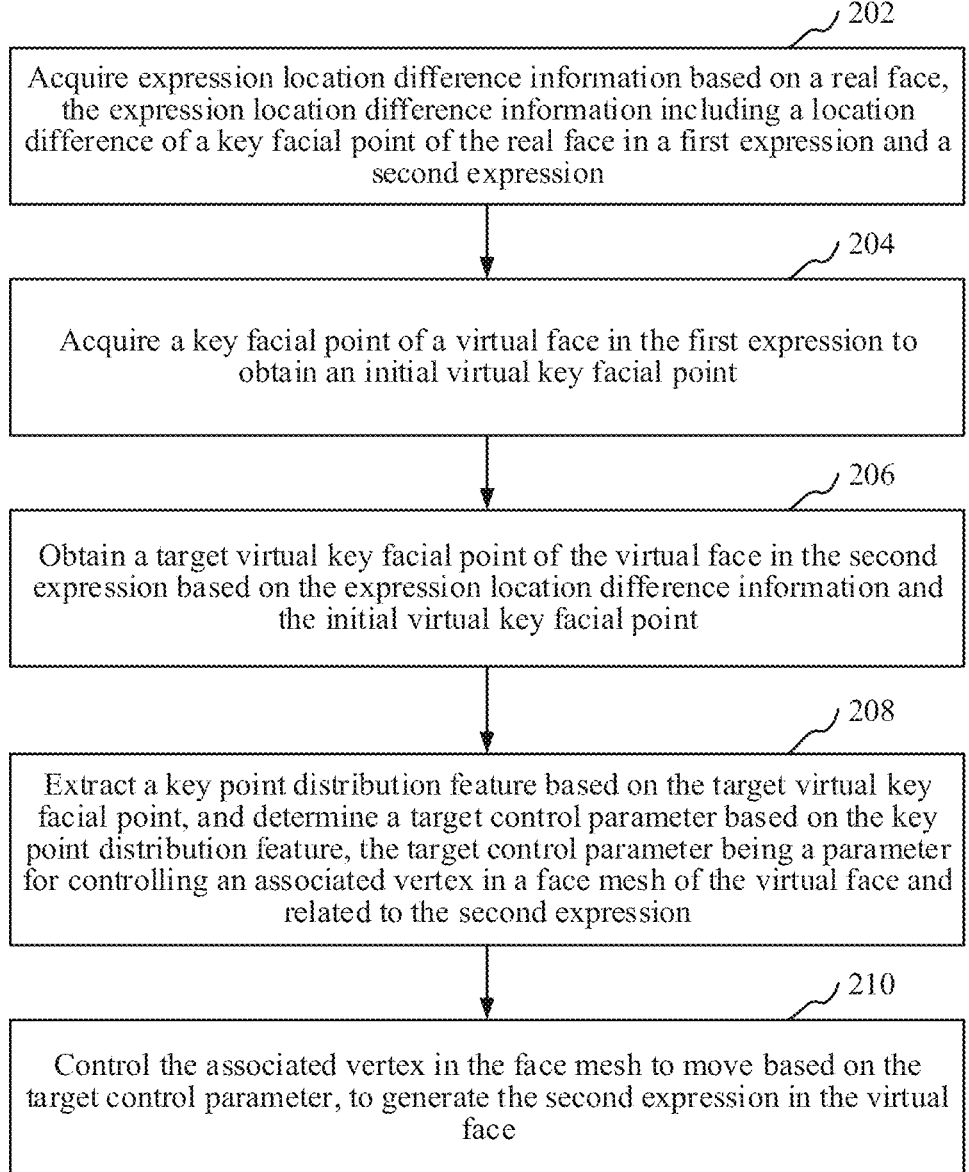

202

Acquire expression location difference information based on a real face, the expression location difference information including a location difference of a key facial point of the real face in a first expression and a second expression

204

Acquire a key facial point of a virtual face in the first expression to obtain an initial virtual key facial point

206

Obtain a target virtual key facial point of the virtual face in the second expression based on the expression location difference information and the initial virtual key facial point

208

Extract a key point distribution feature based on the target virtual key facial point, and determine a target control parameter based on the key point distribution feature, the target control parameter being a parameter for controlling an associated vertex in a face mesh of the virtual face and related to the second expression

210

Control the associated vertex in the face mesh to move based on the target control parameter, to generate the second expression in the virtual face

FIG. 2

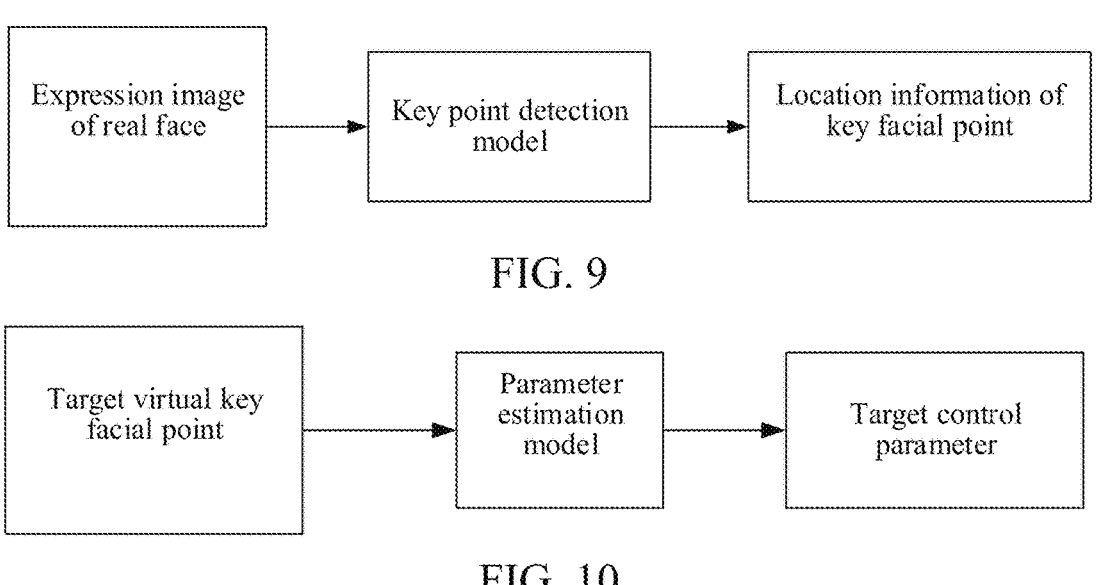
| Expression image of real face | → | Key point detection model | → | Location information of key facial point |
FIG. 9
| Target virtual key facial point | → | Parameter estimation model | → | Target control parameter |
FIG. 10
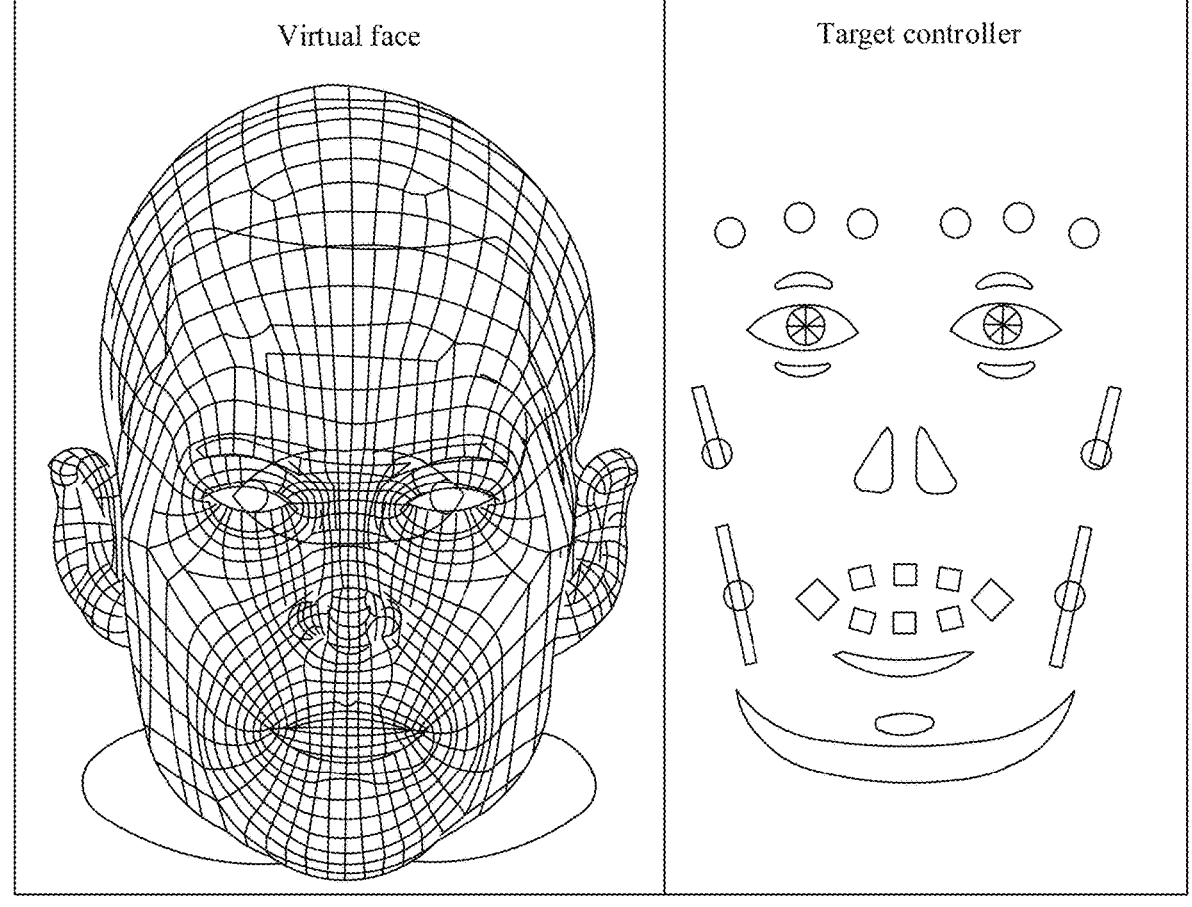
FIG. 11

1

EXPRESSION GENERATION METHOD AND APPARATUS, DEVICE, AND MEDIUM

CROSS-REFERENCES TO RELATED APPLICATIONS

This application is a continuation application of PCT Patent Application No. PCT/CN2022/126077, filed on Oct. 19, 2022, which claims priority to Chinese Patent Application No. 202111473341.7, filed with the China National Intellectual Property Administration on Dec. 6, 2021 and entitled "EXPRESSION GENERATION METHOD AND APPARATUS, DEVICE, MEDIUM, AND COMPUTER PROGRAM PRODUCT", the entire contents of both of which are incorporated herein by reference.

FIELD OF THE TECHNOLOGY

The present disclosure relates to artificial intelligence technologies, and more to the basic technical field of games, and in particular, to an expression generation method and apparatus, a device, a medium, and a computer program product.

BACKGROUND

The development of artificial intelligence technologies has led to the emergence of character expression generation technologies. The character expression generation technology refers to a technology about using a computer to automatically generate complex character expressions, such as complex three-dimensional (3D) character expressions. In related art, the complex expression that needs to be generated is first decomposed into a plurality of meta expressions, and then all meta expressions corresponding to the complex expression are produced by an animator. Further, all meta expressions corresponding to the complex expression are synthesized based on the degree value corresponding to each meta expression, to obtain an expression of a character.

However, the meta expressions need to be produced separately for different characters, and the production of each meta expression needs a lot of time, resulting in low efficiency of expression generation.

SUMMARY

According to various embodiments provided in the present disclosure, an expression generation method and apparatus, a device, a medium, and a computer program product are provided.

An expression generation method, applied to a terminal, the method including: acquiring expression location difference information based on a real face, the expression location difference information including a location difference of a key facial point of the real face in a first expression and a second expression; acquiring a key facial point of a virtual face in the first expression to obtain an initial virtual key facial point; the virtual face being a face of a virtual object; obtaining a target virtual key facial point of the virtual face in the second expression based on the expression location difference information and the initial virtual key facial point; extracting a key point distribution feature based on the target virtual key facial point and determining a target control parameter based on the key point distribution feature, the target control parameter being a parameter for controlling an associated vertex in a face mesh of the virtual face and related to the second expression; and controlling the associated vertex in the face mesh to move based on the target control parameter to generate the second expression in the virtual face.

An expression generation apparatus, including: an acquisition module, configured to: acquire expression location difference information based on a real face, the expression location difference information including a location difference of a key facial point of the real face in a first expression and a second expression; and acquire a key facial point of a virtual face in the first expression to obtain an initial virtual key facial point, the virtual face being a face of a virtual object; a determination module, configured to: obtain a target virtual key facial point of the virtual face in the second expression based on the expression location difference information and the initial virtual key facial point; and extract a key point distribution feature based on the target virtual key facial point and determine a target control parameter based on the key point distribution feature, the target control parameter being a parameter for controlling associated vertex in a face mesh of the virtual face and related to the second expression; and a generation module, configured to control the associated vertex in the face mesh to move based on the target control parameter, to generate the second expression in the virtual face.

A computer device is further provided, including a memory and one or more processors. The memory stores computer-readable instructions. The one or more processors implement the operations in the method embodiments of the present disclosure when executing the computer-readable instructions.

One or more non-transitory computer-readable storage media is provided, storing computer-readable instructions. The computer-readable instructions, when executed by one or more processors, implement the operations in the method embodiments of the present disclosure.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure.

FIG. 2 is a schematic flowchart of an expression generation method according to an embodiment.

FIG. 9 is a schematic flowchart of key point detection according to an embodiment.

FIG. 10 is a schematic flowchart of parameter estimation according to an embodiment.

FIG. 11 is a schematic diagram of binding between a face mesh of a virtual face and a target controller according to an embodiment.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
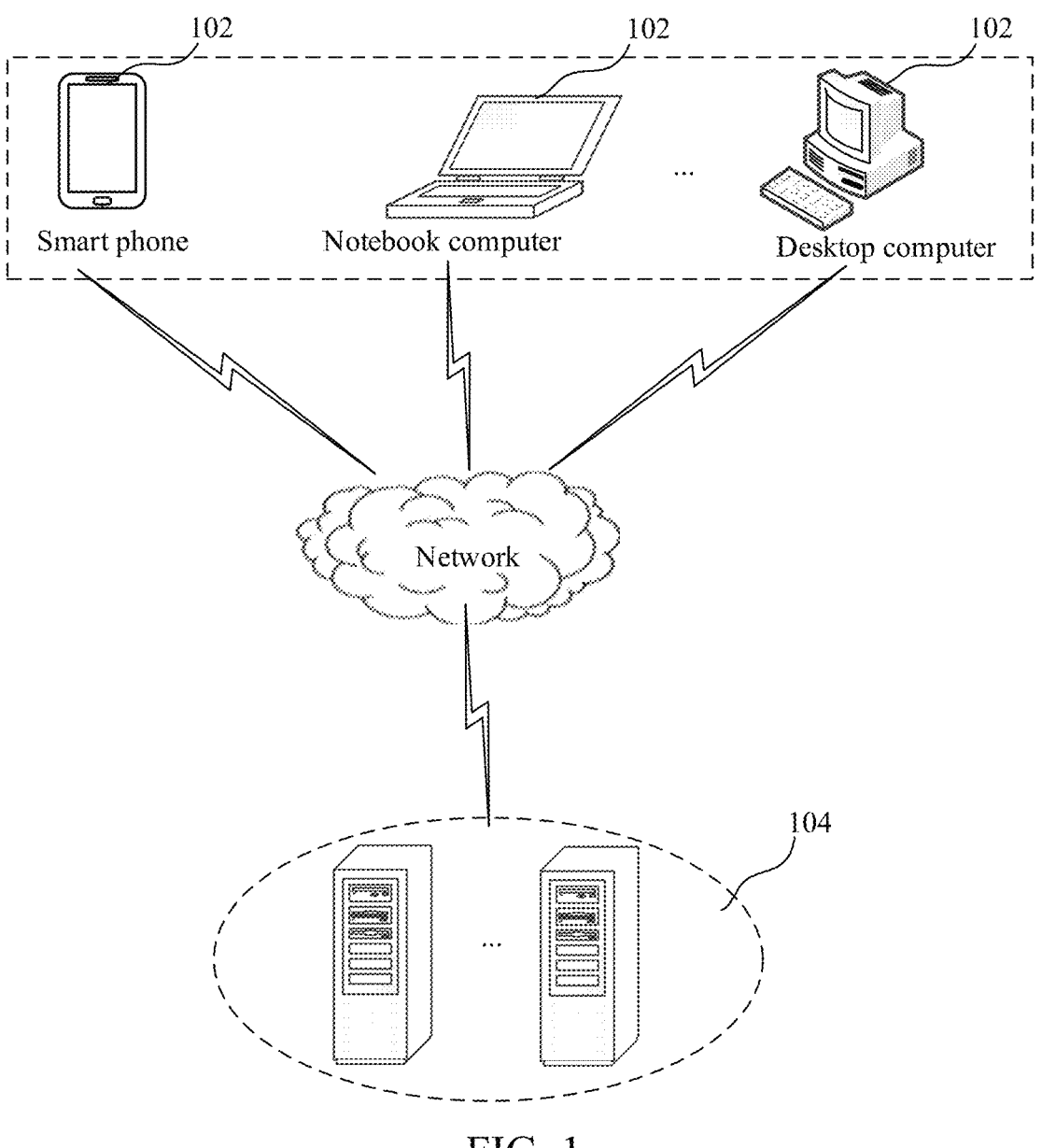
FIG. 1 is a diagram of an application environment of an expression generation method according to an embodiment.

An expression generation method provided in the present disclosure may be applied to an application environment shown in FIG. 1. A terminal 102 communicates with a server 104 through a network. The terminal 102 may be, but is not limited to, various personal computers, notebook computers, smart phones, tablet computers, portable wearable devices, and on-board terminals. The server 104 may be an independent physical server, or may be a server cluster composed of a plurality of physical servers or a distributed system, and may further be a cloud server that provides basic cloud computing services such as a cloud service, a cloud database, cloud computing, a cloud function, cloud storage, a network service, cloud communication, a middleware service, a domain name service, a security service, CDN, big data, and an artificial intelligence platform. The terminal 102 and the server 104 may be directly or indirectly connected through wired or wireless communication, which is not limited in the present disclosure.

The terminal 102 may acquire, from the server 104, a first expression image of a real face in a first expression and a second expression image of the real face in a second expression. The terminal 102 may acquire expression location difference information between the first expression and the second expression based on the first expression image and the second expression image. The expression location difference information includes a location difference of a key facial point of the real face in the first expression and the second expression. The terminal 102 may acquire a key facial point of a virtual face in the first expression to obtain an initial virtual key facial point. The virtual face is a face of a virtual object. The terminal 102 may obtain a target virtual key facial point of the virtual face in the second expression based on the expression location difference information and the initial virtual key facial point, extract a key point distribution feature based on the target virtual key facial point, and determine a target control parameter based on the key point distribution feature, the target control parameter being a parameter for controlling associated vertex in a face mesh of the virtual face and related to the second expression. The terminal 102 may control the associated vertex in the face mesh to move based on the target control parameter to generate the second expression in the virtual face.

The expression generation method in some embodiments of the present disclosure uses the artificial intelligence technology. For example, the key point distribution feature corresponding to the target virtual key facial point belongs to the features extracted by using the artificial intelligence technology, and the target control parameter also belongs to the parameters predicted by using the artificial intelligence technology.

Moreover, the expression generation method in some embodiments of the present disclosure further uses computer vision (CV) technology. For example, first location information and second location information of the key facial point of the real face belong to the information obtained by positioning the first expression image and the second expression image by using the CV technology, respectively.

In an embodiment, as shown in FIG. 2, an expression generation method is provided. The method can be applied to the terminal as well as to the process of interaction between the terminal and the server. This embodiment is described by using an example in which the method is applied to the terminal 102 in FIG. 1. The method includes the following steps:

Step 202: Acquire expression location difference information based on a real face, the expression location difference information including a location difference of a key facial point of the real face in the first expression and the second expression.

The real face is the face of a real object. For example, the face of a real person. It may be understood that the real object is not limited to people, but may also be any other object with a facial expression, such as an animal. The key facial point is a key point indicating a location of a key region on the face. The key facial point may include a key point of a face contour and a key point of a face organ. The first expression is a first type of expression, and the second expression is a second type of expression. It may be understood that the first expression and the second expression are different types of expressions. For example, the first expression is expressionless, the second expression is laughing, and for another example, the first expression is laughing, and the second expression is crying. The expression location difference information is difference information between the position of the key facial point of the real face in the first expression and the position of the key facial point of the real face in the second expression.

It may be understood that the terminal can directly obtain the expression location difference information from the server. That is to say, the server can determine the expression location difference information in advance based on the location difference of the key facial point of the real face in the first expression and the second expression, and the terminal can directly obtain the expression location difference information from the server. The terminal may further acquire the location information of the key facial point of the real face in the first expression, and acquire the location information of the key facial point of the real face in the second expression. The terminal can compare the difference between the location information of the key facial point of the real face in the first expression and the location information of the key facial point of the real face in the second expression, to determine the expression location difference information of the key facial point of the real face in the first expression and the second expression.

In an embodiment, the server stores location information of the key facial point of the real face in the first expression, and location information of the key facial point of the real face in the second expression. The server may transmit the location information of the key facial point of the real face in the first expression and the location information of the key facial point of the real face in the second expression to the terminal. The terminal may receive the location information of the key facial point of the real face in the first expression, and receive the location information of the key facial point of the real face in the second expression.

Figure 3:
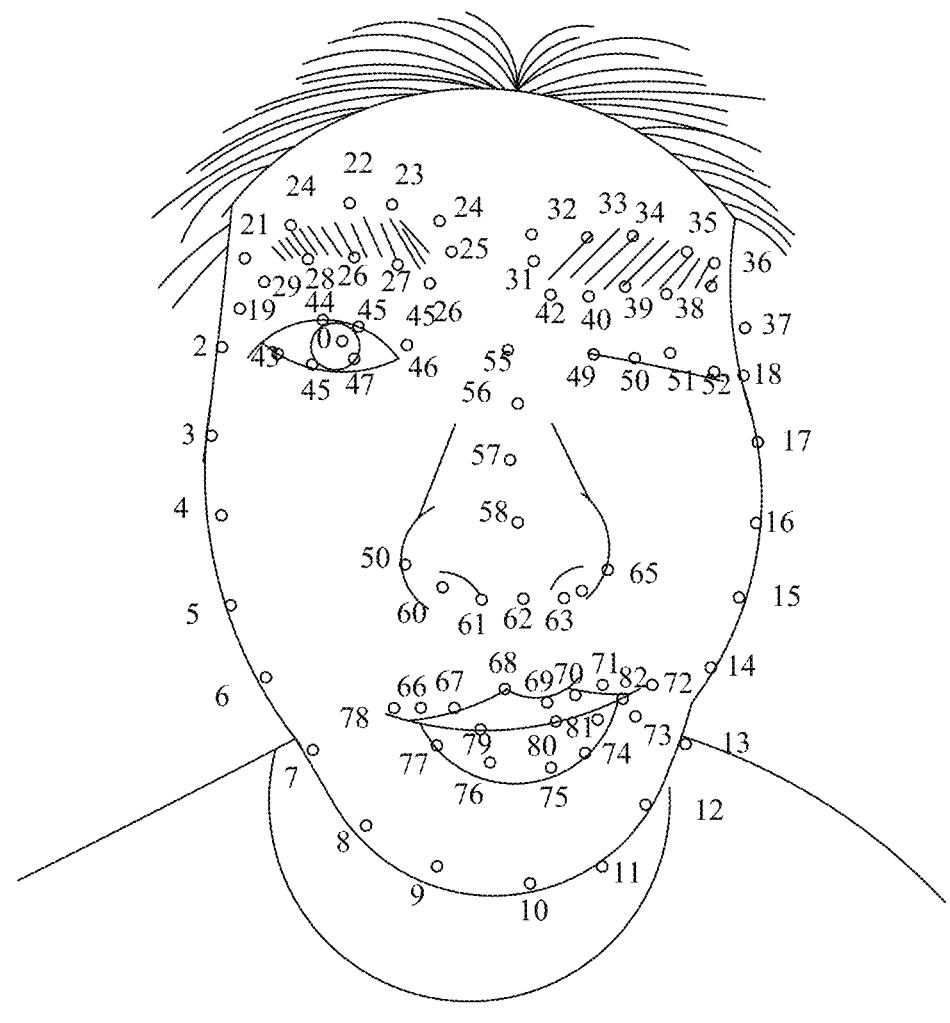
FIG. 3 is a schematic diagram of a key facial point of a real face according to an embodiment.

In an embodiment, the terminal may perform key point detection processing on the real face in the first expression, to obtain the location information of the key facial point of the real face in the first expression. The terminal may perform key point detection processing on the real face in the second expression, to obtain the location information of the key facial point of the real face in the second expression. Referring to FIG. 3, the figure shows the distribution of the key facial point of the real face in the second expression.

In an embodiment, after acquiring the location information of the key facial point of the real face in the first expression and the location information of the key facial point of the real face in the second expression, the terminal can calculate a difference between the location information of the key facial point of the real face in the first expression and the location information of the key facial point of the real face in the second expression, and then directly use the obtained difference as the expression location difference information of the key facial point of the real face in the first expression and the second expression.

Step 204: Acquire a key facial point of a virtual face in the first expression to obtain an initial virtual key facial point, the virtual face being a face of a virtual object.

The virtual object is a virtual object, such as a three-dimensional (3D) virtual character in a game. It may be understood that the virtual object may also be an unreal object created in other non-game scenarios, such as a model created in some design industries. The initial virtual key facial point is the key facial point of the virtual face in the first expression.

Specifically, the terminal can display the virtual face in the first expression on a display interface, and a user can perform a key point annotation operation on the virtual face in the first expression. Further, the terminal can acquire the key facial point marked by the virtual face of the user in the first expression, and obtain the initial virtual key facial point of the virtual face in the first expression.

In an embodiment, the terminal runs an expression generation application, and the expression generation application can provide a key point annotation interface, and the key point annotation interface may include a key point annotation trigger control. the terminal can display the virtual face in the first expression on the key point annotation interface, and the user can perform a key point annotation operation on the virtual face in the first expression based on the key point annotation trigger control. Further, the terminal can acquire the key facial point marked by the virtual face of the user in the first expression, and obtain the initial virtual key facial point of the virtual face in the first expression. The expression generation application is an application for generating the expression.

Figure 4:
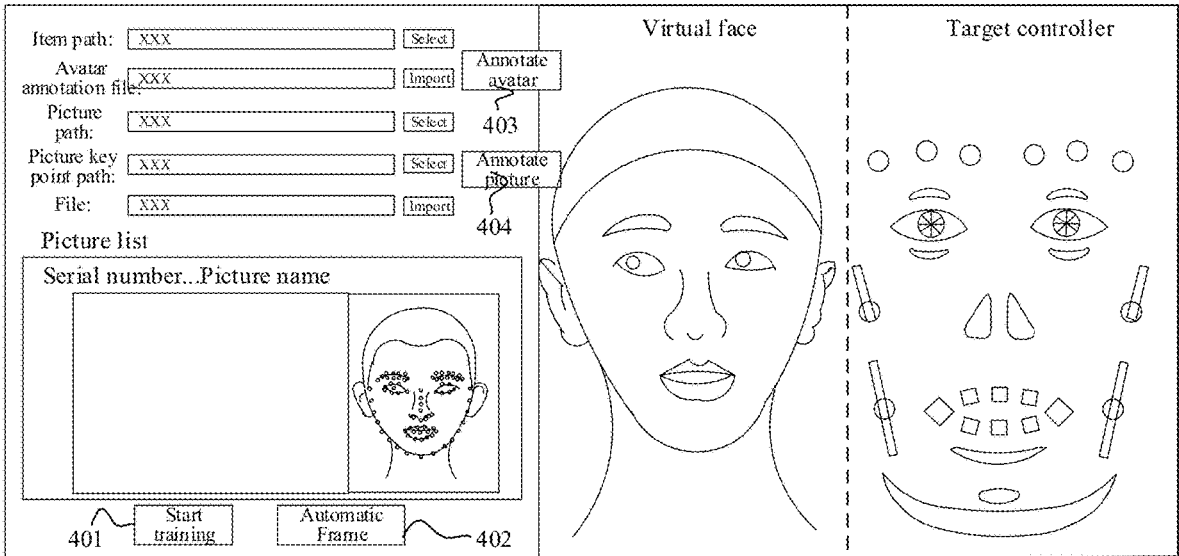
FIG. 4 is a schematic diagram of a main interface of an expression generation application according to an embodiment.

In an embodiment, FIG. 4 is a schematic diagram of a main interface of an expression generation application. The main interface includes an item path and a file path such as an avatar annotation file. The item path can be configured to store an item corresponding to the key facial point of the virtual face, and the avatar annotation file can be configured to record the location information of the key facial point of the virtual face. The user can perform the key point annotation operation on the virtual face in the first expression based on an "annotation avatar" button 403 in the main interface. Further, the terminal may acquire the initial virtual key facial point of the virtual face in the first expression.

Figure 5:
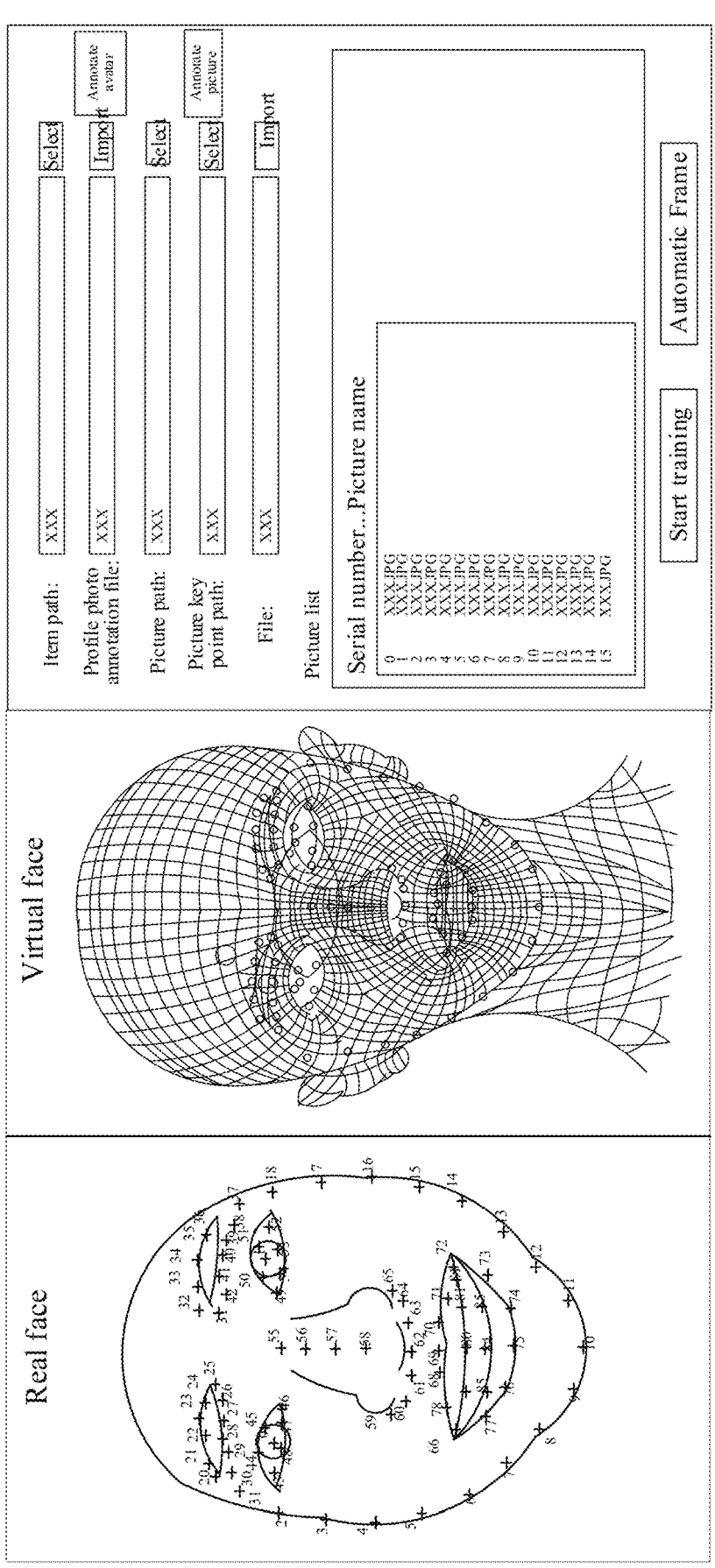
FIG. 5 is a schematic diagram of an interface marked with a key facial point of a virtual face according to an embodiment.
Figure 6:
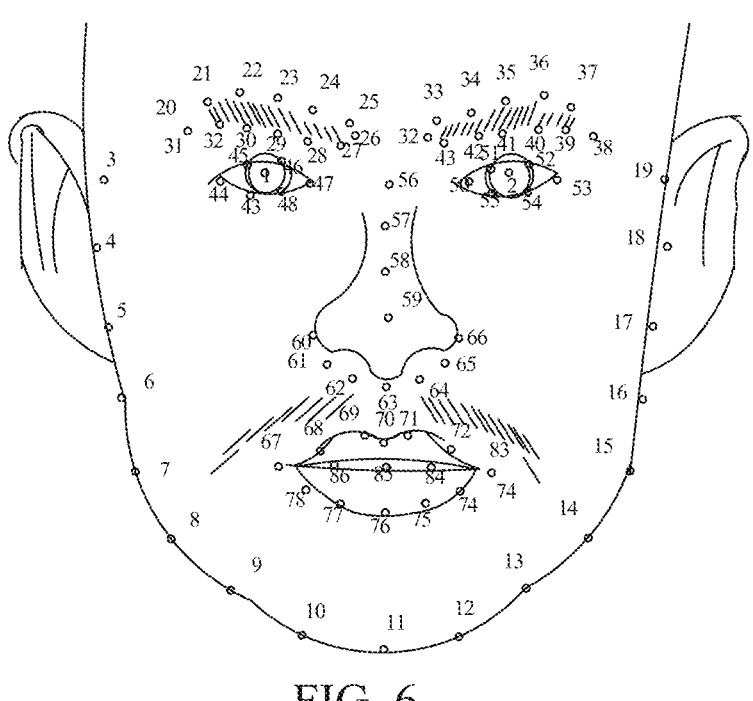
FIG. 6 is a schematic diagram of an initial key facial point of a virtual face in a first expression according to an embodiment.

In an embodiment, as shown in FIG. 5, when the user triggers the "annotation avatar" button 403, an annotation page of the expression generation application can display the real face that has been marked with the key facial point. Further, the user can refer to the real face that has been marked with the key facial point, and perform the key point annotation operation on the virtual face in the first expression to obtain the initial virtual key facial point. The distribution of the initial virtual key facial point s in the virtual face is shown in FIG. 6.

Step 206: Obtain a target virtual key facial point of the virtual face in the second expression based on the expression location difference information and the initial virtual key facial point.

The target virtual key facial point is the key facial point of the virtual face in the second expression.

Specifically, the terminal can determine adjustment information of the initial virtual key facial point based on the expression location difference information. Further, the terminal can adjust the initial virtual key facial point according to the determined adjustment information, and the target virtual key facial point of the virtual face in the second expression is obtained after the adjustment is completed.

In an embodiment, the adjustment information includes a movement distance. The terminal can determine a current position of the initial virtual key facial point, and determine the adjustment information of the initial virtual key facial point based on the expression location difference information. Further, the terminal can move the initial virtual key facial point from the current position of the initial virtual key facial point according to the determined movement distance, to obtain the target virtual key facial point of the virtual face in the second expression.

Step 208: Extract a key point distribution feature based on the target virtual key facial point and determine a target control parameter based on the key point distribution feature, the target control parameter being a parameter for controlling associated vertex in a face mesh of the virtual face and related to the second expression.

The key point distribution feature is the distribution feature of the target virtual key facial point on the virtual face. The face mesh is a mesh that makes up the virtual face. It may be understood that the face mesh is a set of face shape meshes acquired each time the expression changes. The face mesh includes a plurality of mesh regions, and the mesh region is a smallest unit of the face mesh. The face mesh includes a plurality of mesh lines and a plurality of mesh vertexes, and each of the mesh vertexes is a point where more than two mesh lines intersect. The associated vertex is the mesh vertex in the face mesh associated with the second expression. It may be understood that the associated vertex is the mesh vertex that is in the same mesh region as the target virtual key facial point.

Figure 7:
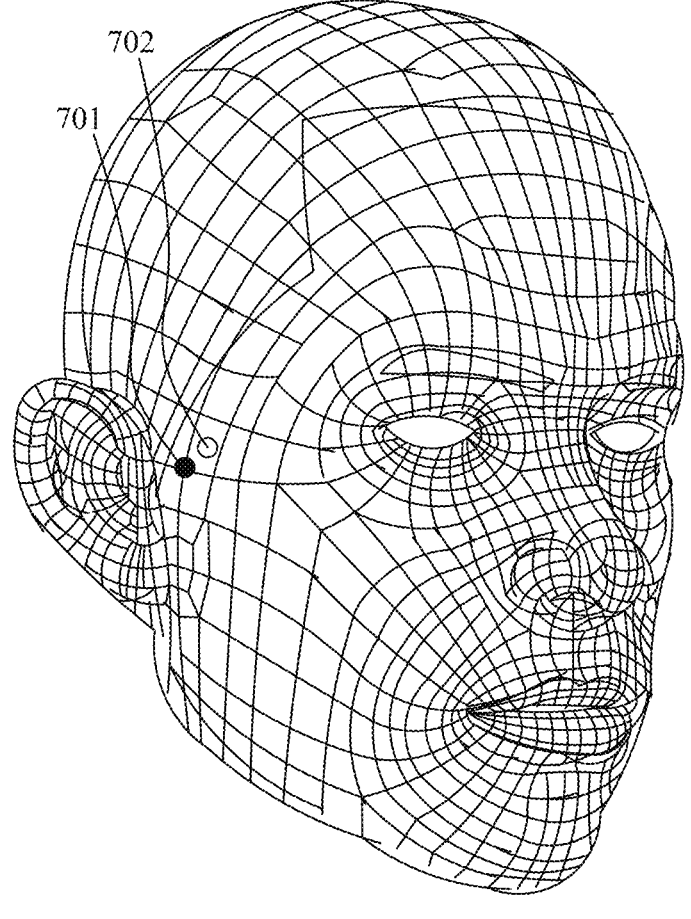
FIG. 7 is a schematic diagram of a face mesh of a virtual face according to an embodiment.

In an embodiment, the virtual face can be arranged on the face mesh, and each mesh includes a plurality of mesh vertexes. The terminal may determine the mesh vertex associated with the second expression (that is, the mesh vertex corresponding to the target virtual key facial point) as the associated vertex. For example, referring to FIG. 7, 701 (that is, a black dot) in the figure is one of the associated vertexes related to the second expression, and 702 (that is, a white dot) in the figure is the target virtual key facial point.

It may be understood that the key point distribution feature represents the target virtual key facial point of the target virtual face on the virtual face. The distribution of the key facial point on the face varies in a different expression. Therefore, the terminal can perform distribution feature extraction process on the target virtual key facial point. That is to say, the terminal can analyze the relative location information between the target virtual key facial point in the virtual face. The relative location information between the target virtual key facial point can reflect the position distribution of the target virtual key facial point on the virtual face. Therefore, the terminal can obtain the key point distribution feature of the target virtual key facial point in the virtual face based on the relative location information between the target virtual key facial point. Further, the terminal can perform parameter estimation process on the target virtual key facial point based on the key point distribution feature of the target virtual key facial point in the virtual face, to obtain the target control parameter corresponding to the target virtual key facial point.

Step 210: Control the associated vertex in the face mesh to move based on the target control parameter to generate the second expression in the virtual face.

Specifically, the target control parameter has a binding relationship with the associated vertex in the face mesh. The terminal can control the movement of the associated vertex in the face mesh in the first expression based on the target control parameter, thereby controlling the virtual face to be converted from the first expression to the second expression. It may be understood that the key facial point of the virtual face has a corresponding relationship with the associated vertex, and the movement of the associated vertex can control the movement of the key facial point of the virtual face. However, the key point distribution feature of the target virtual key facial point in the virtual face is known. Based on the target control parameter corresponding to the target virtual key facial point, the associated vertex in the face mesh in the first expression can be controlled to move. Further, the key facial point of the virtual face is also controlled to move along with each other until the virtual face changes from the first expression to the second expression in response to that the distribution of the key facial point of the virtual face satisfies the key point distribution feature corresponding to the target virtual key facial point.

Figure 8:
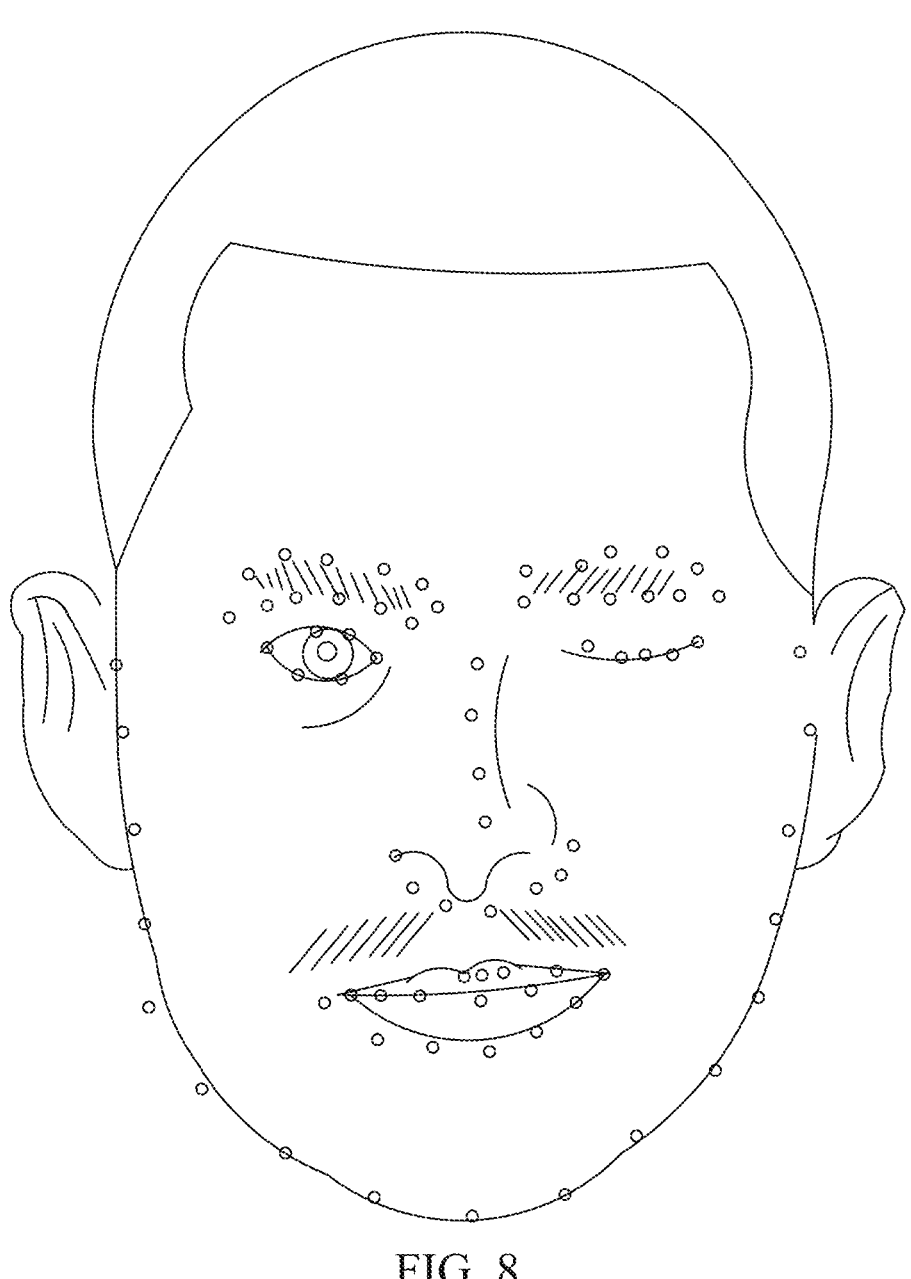
FIG. 8 is a schematic diagram of a target key facial point of a virtual face in a second expression according to an embodiment.

In an embodiment, the distribution of the target virtual key facial point on the virtual face in the second expression can be referred to FIG. 8. It may be understood that the target virtual key facial point is the key point information used for locating a key region position on the virtual face. In FIG. 8, the target virtual key facial point is represented by hollow circles, and the distribution of the target virtual key facial point in the virtual face can be more clearly represented.

In the above expression generation method, the expression location difference information obtained based on the real face is acquired. The expression location difference information may include a location difference of the key facial point of the real face in a first expression and a second expression. The key facial point of the virtual face in the first expression is acquired to obtain the initial virtual key facial point. The target virtual key facial point of the virtual face in the second expression may be acquired based on the expression location difference information and the initial virtual key facial point. A key point distribution feature may be extracted based on the target virtual key facial point, and the target control parameter can be quickly determined based on the key point distribution feature. The target control parameter is a parameter for controlling the associated vertex in the face mesh of the virtual face and related to the second expression. Further, the movement of the associated vertex in the face mesh is controlled based on the target control parameter, to produce the second expression in the virtual face. Compared with the expression generation method in related art, the expression generation method of the present disclosure can easily control the expression that produces a corresponding change in the virtual face, only by requiring to acquire the key facial point of the virtual face in the first expression and combining the key facial point of the real face with the expression location difference in a different expression, which improves the efficiency of expression generation.

Moreover, the expression generation method in related art can only generate an expression that can be synthesized by a meta expression made by an animator. However, the expression generation method of the present disclosure directly controls the virtual face to generate a corresponding expression through the target control parameter corresponding to the key point of the virtual face, so that an arbitrary expression can be generated, which improves the flexibility of the expression production.

In an embodiment, the acquiring expression location difference information based on a real face includes: acquiring a first expression image of the real face in the first expression; acquiring a second expression image of the real face in the second expression; determining first location information of a key facial point of the real face in the first expression image (e.g., locating a key facial point of the real face in the first expression image to determine the first location information); determining second location information of the key facial point of the real face in the second expression image (e.g., locating the key facial point of the real face in the second expression image to determine the second location information); and determining a difference between the first location information and the second location information to obtain the expression location difference information.

The first expression image refers to an image of the real face in the first expression. The second expression image refers to an image of the real face in the second expression. The first location information is the location information of the key facial point of the real face in the first expression. The second location information is the location information of the key facial point of the real face in the second expression.

Specifically, the terminal may acquire the first expression image of the real face in the first expression and the second expression image of the real face in the second expression. The terminal may perform the key point detection processing on the first expression image to determine the first location information of the key facial point of the real face from the first expression image. The terminal may perform the key point detection processing on the second expression image to determine the second location information of the key facial point of the real face from the second expression image. The terminal may determine the difference between the first location information and the second location information, and determine the expression location difference information based on the difference between the first location information and the second location information.

In an embodiment, the terminal includes an image acquisition unit. The terminal may acquire the first expression image of the real face in the first expression and the second expression image of the real face in the second expression through the image acquisition unit.

In an embodiment, the server stores the first expression image of the real face in the first expression and the second expression image of the real face in the second expression. The server may transmit the first expression image of the real face in the first expression and the second expression image of the real face in the second expression to the terminal. The terminal may receive the first expression image of the real face in the first expression and the second expression image of the real face in the second expression transmitted by the server.

In an embodiment, as shown in FIG. 4, the main interface of the expression generation application further includes a picture path, a picture key point path, and a picture list. The picture path may be configured to store the first expression image and the second expression image. The picture key point path may be configured to store the first location information and the second location information. The picture list may be configured to display the image information of the first expression image and the second expression image, such as an image sequence number and an image name.

In an embodiment, as shown in FIG. 4, the main interface of the expression generation application further includes an "annotated picture" button 404. By triggering the "annotated picture" button 404, the terminal can directly locate the first location information of the key facial point of the real face in the first expression image, and locate the second location information of the key facial point of the real face in the second expression image.

In an embodiment, the first expression image and the second expression image may specifically be a red, green, and blue (RGB) image.

In the foregoing embodiment, by performing the key point detection on the first expression image of the real face in the first expression and the second expression image of the real face in the second expression, the first location information of the key facial point of the real face and the second location information of the key facial point of the real face can be directly and accurately obtained. Further, based on the difference between the first location information and the second location information, the expression location difference information is obtained, which improves the acquisition efficiency and accuracy of the expression location difference information, thereby further improving the expression generation efficiency.

In an embodiment, the first location information and the second location information are obtained by detecting a trained key point detection model; and the step of obtaining the trained key point detection model includes: acquiring sample data, the sample data including a sample expression image and reference location information of the key facial point marked for the sample expression image; inputting the sample expression image into a to-be-trained key point detection model, to obtain predicted location information of the key facial point; determining a first loss value based on an error between the predicted location information of the key facial point and the reference location information of the key facial point; and iteratively training the to-be-trained key point detection model to reduce the first loss value until an iteration stopping condition is satisfied, to obtain the trained key point detection model.

The sample data is the data used for training the key point detection model. The sample expression image is used for training the key point detection model. The reference location information is the location information of the key facial point marked for the sample expression image. The predicted location information is the location information of the key facial point obtained by predicting the sample expression image through a to-be-trained key point detection model. The first loss value is a loss value determined based on an error between the predicted location information of the key facial point and the reference location information of the key facial point.

In an embodiment, the terminal runs a trained key point detection model. The terminal may acquire the first expression image of the real face in the first expression and the second expression image of the real face in the second expression. As shown in FIG. 9, the terminal can input the first expression image to the trained key point detection model, perform the key point detection processing on the first expression image through the trained key point detection model, and detect the first location information of the key facial point of the real face from the first expression image. Moreover, the terminal can input the second expression image to the trained key point detection model, perform the key point detection processing on the second expression image through the trained key point detection model, and detect the second location information of the key facial point of the real face from the second expression image. Further, the terminal may determine the difference between the first location information and the second location information, and determine the expression location difference information based on the difference between the first location information and the second location information.

Specifically, the terminal runs the to-be-trained key point detection model. The terminal may acquire the sample data, and input the sample expression image into the sample data to the to-be-trained key point detection model. Through the to-be-trained key point detection model, the key point detection processing of the sample expression image is performed and the predicted location information of the key facial point is obtained. The terminal may determine the error between the predicted location information of the key facial point and the reference location information of the key facial point annotated for the sample expression image, and determine the first loss value based on the error between the predicted location information of the key facial point and the reference location information of the key facial point annotated for the sample expression image. The terminal may iteratively train the to-be-trained key point detection model to reduce the first loss value until an iteration stopping condition is satisfied, to obtain the trained key point detection model.

In an embodiment, the iteration stopping condition may be that the first loss value reaches a preset loss value threshold, or a number of iteration rounds reaches a preset round threshold.

In an embodiment, a mean square error function may be used as a loss function of the trained key point detection model, and the loss function may be expressed by using the following formula:

$$L_{loss} = \text{MeanSquaredError}(K_{predict}, K_{groundtruth})$$

$L_{loss}$ represents the first loss value, MeanSquaredError( ) represents the mean square error function, $K_{predict}$ represents the predicted location information of the key facial point, and $K_{groundtruth}$ represents the reference location information of the key facial point.

In the foregoing embodiment, the to-be-trained key point detection model is iteratively trained through the sample expression image and the reference location information of the key facial point marked for the sample expression image, so that the key point detection accuracy of the key point detection model can be improved.

In an embodiment, the expression generation method further includes: acquiring third location information of the initial virtual key facial point; respectively normalizing the first location information, the second location information, and the third location information to obtain normalized first location information, normalized second location information, and normalized third location information; the determining a difference between the first location information and the second location information to obtain the expression location difference information includes: obtaining the expression location difference information based on a difference between the normalized first location information and the normalized second location information; and the obtaining a target virtual key facial point of the virtual face in the second expression based on the expression location difference information and the initial virtual key facial point includes: adjusting the normalized third location information according to the expression location difference information, to obtain the target virtual key facial point of the virtual face in the second expression.

The third location information is the location information of the initial virtual key facial point in the first expression.

Specifically, the user can mark the key point of the virtual face in the first expression, and the terminal can directly acquire the third location information of the initial virtual key facial point based on the initial virtual key facial point marked. The terminal may normalize the first location information, the second location information, and the third location information respectively, to obtain normalized first location information, normalized second location information, and normalized third location information. The terminal may determine the difference between the normalized first location information and the normalized second location information, and determine the expression location difference information of the key facial point of the real face in the first expression and the second expression based on the difference between the normalized first location information and the normalized second location information. The terminal may adjust the normalized third location information according to the expression location difference information, to obtain a target virtual key facial point of the virtual face in the second expression.

In an embodiment, the terminal may use location information to be normalized as current location information in response to that normalization processing is performed on each piece of the first location information, the second location information, and the third location information. The terminal may determine, for each piece of the current location information, a reference key facial point that satisfies a location stability condition. Further, the terminal can determine the normalized standard information according to the reference key facial point, and perform normalization processing on each piece of the first location information, the second location information and the third location information based on the normalized standard information. The location stability condition is the condition that keeps the position of the key facial point relatively stable. The reference key facial point is the key facial point as the reference in the normalization process. The normalized standard information is the information that is used as the standard in the normalization process.

In an embodiment, the location stability condition may specifically be that a distance that a key facial point moves on a corresponding face when a switch occurs from a first expression to a second expression is less than a preset movement distance. The location stability condition may further specifically be that the key facial point does not move on the corresponding face when switching from the first expression to the second expression. For example, when the first expression is switched to the second expression, the key facial point corresponding to the four corners of the face basically do not move on the corresponding face. For another example, when the first expression is switched to the second expression, the key facial point corresponding to the temples on both sides of the face basically do not move on the corresponding face.

In the above-described embodiment, by respectively performing the normalization processing on the first location information, the second location information, and the third location information, a face shape difference between the real face and the virtual face can be reduced. Further, more accurate expression location difference information can be obtained based on a difference between the normalized first location information and the normalized second location information. The normalized third location information is adjusted according to the expression location difference information, and a more accurate target virtual key facial point of the virtual face in the second expression can be obtained, so that the second expression generated in the virtual face is more consistent with the corresponding second expression of the real face.

In an embodiment, the respectively normalizing the first location information, the second location information, and the third location information includes: using the normalized location information as current location information in response to that each piece of the first location information, the second location information, and the third location information is normalized; determining, for each piece of the current location information, a reference key facial point that satisfies a location stability condition; determining a reference point corresponding to the current location information based on the reference key facial point, and determining a relative distance between the reference key facial point and the reference point; determining a scaling ratio based on a distance between any two reference key facial points; and normalizing the current location information according to the relative distance and the scaling ratio.

The reference point corresponding to the current location information is the reference point for the normalizing the current location information. The relative distance is the distance between the reference key facial point and the reference point. The scaling ratio is the ratio used as reference when the current location information is normalized.

Specifically, the terminal may use the normalized location information as current location information in response to that each piece of the first location information, the second location information, and the third location information is normalized. The terminal may filter out, for each piece of the current location information, the reference key facial point that satisfies the location stability condition from the key facial point of the corresponding face. The terminal may determine a reference point corresponding to the current location information based on the reference key facial point, and determining a relative distance between the reference key facial point and the reference point. The terminal may determine the distance between any two reference key facial points and determine the scaling ratio based on the distance between any two reference key facial points. Further, the terminal may normalize the current location information according to the relative distance and the scaling ratio.

In an embodiment, the terminal determines the reference point corresponding to the current location information based on the reference key facial point. Specifically, the terminal may determine the reference point corresponding to the current location information based on all the reference key facial points filtered out. Alternatively, the terminal may determine the reference point corresponding to the current location information based on the selected part of the reference key facial point among all the reference key facial points.

For example, the key facial point corresponding to the four corners of the eyes in the corresponding face belong to the four reference key facial points among all the selected reference key facial point. The terminal may determine a center point of the four reference key facial points as a reference point corresponding to the current location information. The terminal may determine the scaling ratio by the distance between the key facial points corresponding to the temples on both sides of the corresponding face.

In an embodiment, the terminal may subtract the coordinates of the reference key facial point from the coordinates of the reference point to obtain the subtracted coordinates. The terminal can take the ratio of the reduced coordinates to the scaling ratio as the current location information after normalization, that is, the normalized coordinates of the key facial point.

In an embodiment, in response to that the current location information is the first location information or the second location information, the normalized coordinates of the key facial point may be calculated by using the following formula:

$$NK_{ri} = \frac{K_{ri} - O_{ri}}{L_{ri}}$$

$NK_{ri}$ represents the normalized coordinates of the key facial point of the real face in the corresponding expression, $K_{ri}$ represents the coordinates of the reference key facial point of the real face in the corresponding expression, $O_{ri}$ represents the coordinates of the reference point of the real face in the corresponding expression, and $L_{ri}$ represents the scaling ratio of the real face in the corresponding expression. It may be understood that the corresponding expression is the first expression or the second expression.

In an embodiment, in response to that the current location information is the third location information, the normalized coordinates of the key facial point may be calculated by using the following formula:

$$NK_{g,neutral} = \frac{K_{g,neutral} - O_{g,neutral}}{L_{g,neutral}}$$

$NK_{g,neutral}$ represents the normalized coordinates of the key facial point of the virtual face in the first expression, $K_{g,neutral}$ represents the coordinates of the reference key facial point of the virtual face in the first expression, $O_{g,neutral}$ represents the coordinates of the reference point of the virtual face in the first expression, and $L_{g,neutral}$ represents the scaling ratio of the virtual face in the first expression.

In the foregoing embodiment, based on the reference key facial point that does not undergo large deformation, the reference point corresponding to the current location information can be determined, and the relative distance between the reference key facial point and the reference point can be determined. Based on the distance between any two reference key facial points, the scaling ratio can be determined, and the current location information can be normalized according to the relative distance and the scaling ratio. In this way, the difference in the face shape between the real face and the virtual face can be further reduced, so that the second expression generated in the virtual face can be more closely matched with the corresponding second expression of the real face.

In an embodiment, the adjusting the normalized third location information according to the expression location difference information, to obtain the target virtual key facial point of the virtual face in the second expression includes: adjusting the normalized third location information according to the expression location difference information, to obtain intermediate state location information of the key facial point of the virtual face in the second expression; and performing inverse normalization on the intermediate state location information based on a relative distance and a scaling ratio corresponding to the third location information, to obtain the target virtual key facial point of the virtual face in the second expression.

The intermediate state location information is the location information of the key facial point of the virtual face in the second expression and belonging to the intermediate state. It may be understood that the intermediate state location information refers to the location information that requires to be further processed in the inverse normalization, which is equivalent to a kind of intermediate result. The intermediate state location information only exists in the inverse normalization, and is not outputted as the result of the inverse normalization.

Specifically, the normalized third location information is adjusted according to the expression location difference information, to obtain intermediate state location information of the key facial point of the virtual face in the second expression; and inverse normalization is performed on the intermediate state location information based on a relative distance and a scaling ratio corresponding to the third location information, to obtain the target virtual key facial point of the virtual face in the second expression.

In an embodiment, the intermediate state location information includes intermediate state coordinates. The terminal may determine the expression location difference information according to the difference between the normalized coordinates of the key facial point of the real face in the second expression and the normalized coordinates of the key facial point of the real face in the first expression. The terminal may adjust the normalized coordinates of the key facial point of the virtual face in the first expression according to the expression location difference information to obtain the intermediate state coordinates. The terminal may first multiply the intermediate state coordinates by the scaling ratio of the virtual face in the first expression, and then add the coordinates of the reference point of the virtual face in the first expression (that is, inverse normalization is performed on the intermediate state location information) to obtain coordinates of the target virtual key facial point of the virtual face in the second expression.

In an embodiment, the coordinates of the target virtual key facial point of the virtual face in the second expression may be calculated by using the following formula:

$$K_{i,r2g}=((NK_{ri}-N_{r,neutral})+NK_{g,neutral})*L_{g,neutral}+O_{g,neutral}$$

$K_{i,r2g}$ represents the coordinates of the target virtual key facial point of the virtual face in the second expression, and $NK_{r,neutral}$ represents the normalized coordinates of the key facial point of the real face in the first expression.

In the foregoing embodiment, inverse normalization may be performed on the intermediate state location information based on the relative distance and the scaling ratio corresponding to the third location information, to reduce the position error caused by the normalization, so that a more accurate target virtual key facial point of the virtual face in the second expression can be obtained.

In an embodiment, the extracting a key point distribution feature based on the target virtual key facial point and determine a target control parameter based on the key point distribution feature includes: inputting the target virtual key facial point into a trained parameter estimation model, and perform a distribution feature extraction on the target virtual key facial point through the trained parameter estimation model to obtain a key point distribution feature, and performing parameter estimation based on the key point distribution feature to output the target control parameter.

Specifically, the terminal runs a trained parameter estimation model. As shown in FIG. 10, the terminal may input the target virtual key facial point into the trained parameter estimation model, and perform a distribution feature extraction on the target virtual key facial point through the trained parameter estimation model to obtain the key point distribution feature. Further, the terminal may perform the parameter estimation on the target virtual key facial point based on the key point distribution feature through the trained parameter estimation model, and output the target control parameter.

In an embodiment, the target control parameter can be obtained by the following formula:

$$P_i=K2P(K_{i,r2g})$$

$P_i$ represents the target control parameter, and K2P( ) represents the trained parameter estimation model.

In the foregoing embodiment, the distribution feature extraction is performed on the target virtual key facial point through the trained parameter estimation model with better prediction effect, and the key point distribution feature is obtained, and the parameter prediction is performed based on the key point distribution feature, and the target control parameter is directly outputted. In this way, the efficiency of obtaining the target control parameter can be improved, and the accuracy of the target control parameter can be improved.

In an embodiment, the step of obtaining the trained parameter estimation model includes: acquiring a reference control parameter for generating a sample expression; acquiring a sample key facial point corresponding to the reference control parameter; inputting the sample key facial point into a to-be-trained parameter estimation model to obtain a prediction control parameter; determining a second loss value based on an error between the prediction control parameter and the reference control parameter; and iteratively training the to-be-trained parameter estimation model to reduce the second loss value until an iteration stopping condition is satisfied, to obtain the trained parameter estimation model.

The reference control parameter is the control parameter used in the training parameter estimation model. The sample key facial point is the key facial point used for training the parameter estimation model. The prediction control parameter is the control parameter obtained by the to-be-trained parameter estimation model to perform the parameter estimation on the sample key facial point.

Specifically, the terminal runs an expression generation application. The terminal can randomly generate the reference control parameter for generating the sample expression through the expression generation application. After the terminal acquires the reference control parameter, the sample key facial point corresponding to the reference control parameter can be acquired. The terminal can input the sample key facial point into the to-be-trained parameter estimation model, and perform the parameter estimation on the sample key facial point through the to-be-trained parameter estimation model to obtain the prediction control parameter. The terminal may determine an error between the prediction control parameter and the reference control parameter, and determine a second loss value based on the error between the prediction control parameter and the reference control parameter. The terminal may perform an iterative training on the to-be-trained parameter estimation model in a direction that reduces the second loss value until the trained parameter estimation model is obtained in response to that an iteration stopping condition is met.

In an embodiment, as shown in FIG. 4, the main interface of the expression generation application further includes a "start training" button 401. By triggering the "start training" button 401, the terminal can obtain the reference control parameter for generating the sample expression, acquire the sample key facial point corresponding to the reference control parameter, and train the to-be-trained parameter estimation model through the reference control parameter and reference control parameter.

In an embodiment, the terminal acquires the sample key facial point corresponding to the reference control parameter. It may be understood that the virtual face can be deformed to generate the corresponding sample expression in the control of the reference control parameter, and the terminal may directly acquire the location information of the key facial point of the virtual face in the sample expression.

In an embodiment, a mean square error function may be used as a loss function of the trained parameter estimation model, and the loss function may be expressed by the following formula:

$$Loss=MeanSquaredError=(P_{predict},P_{groundtruth})$$

Loss represents the second loss value, $P_{predict}$ represents the prediction control parameter, and $P_{groundtruth}$ represents the reference control parameter.

In the foregoing embodiment, by the reference control parameter and the sample key facial point corresponding to the reference control parameter, the iterative training of the to-be-trained parameter estimation model can improve the accuracy of the parameter estimation model.

In an embodiment, the sample key facial point is located in a target mesh region of the face mesh. The sample key facial point corresponds to a plurality of target vertexes forming the target mesh region; and the acquiring a sample key facial point corresponding to the reference control parameter includes: determining, for the sample key facial point, each of the target vertexes corresponding to the sample key facial point, and determining spatial coordinates of each target vertex in the sample expression, the spatial coordinates being coordinates in a world coordinate system;

determining regional coordinates of the sample key facial point in the target mesh region, the regional coordinates being coordinates in a regional coordinate system established based on the target mesh region; and performing coordinate conversion on the regional coordinates of the sample key facial point based on the spatial coordinates of each target vertex, to obtain spatial coordinates of the sample key facial point, so as to obtain the sample key facial point corresponding to the reference control parameter.

The target mesh region is the grid region in the face mesh where the sample key facial point is located. The target vertex is the mesh vertex of the face mesh that forms the target mesh region.

Specifically, the terminal, for each sample key facial point, may determine the mesh vertex forming the corresponding target mesh region as the target vertex corresponding to the sample key facial point. Since the spatial coordinates of the mesh vertex of the face mesh are known, the terminal can directly obtain the spatial coordinates of each target vertex in the sample expression. The terminal can directly determine regional coordinates of the sample key facial point in the target mesh region based on the target vertex. The terminal can perform coordinate transformation on the regional coordinates of the sample key facial point based on the spatial coordinates of each target vertex, so as to convert the regional coordinates of the sample key facial point in the regional coordinate system to the spatial coordinates in the world coordinate system, and obtain the spatial coordinates of the sample key facial point, and obtain the reference control parameter corresponding to the sample key facial point.

In the foregoing embodiment, by determining each target vertex corresponding to the sample key facial point, the spatial coordinates of the target vertex in the sample expression can be accurately determined. By determining the regional coordinates of the sample key facial point in the target mesh region, the regional coordinates of the sample key facial point can be converted based on the spatial coordinates of each target vertex, and the accurate spatial coordinates of the sample key facial point can be obtained, so as to obtain the sample key facial point corresponding to the reference control parameter. In this way, the accuracy of the sample key facial point is improved.

In an embodiment, the regional coordinate system is a coordinate system established by an origin of regional coordinates; the origin of regional coordinates is any one of the plurality of target vertexes forming the target mesh region; and the performing coordinate conversion on the regional coordinates of the sample key facial point based on the spatial coordinates of each target vertex, to obtain spatial coordinates of the sample key facial point includes: determining a relative location of the sample key facial point relative to the origin of regional coordinates in the world coordinate system based on the spatial coordinates of each target vertex and the regional coordinates of the sample key facial point; acquiring spatial coordinates of the origin of regional coordinates in the world coordinate system; and determining the spatial coordinates of the sample key facial point based on the spatial coordinates of the origin of regional coordinates and the relative location.

Specifically, the terminal may determine a relative location of the sample key facial point relative to the origin of regional coordinates in the world coordinate system based on the spatial coordinates of each target vertex and the regional coordinates of the sample key facial point. Since the spatial coordinates of the mesh vertex of the face mesh are known, the origin of regional coordinates is any one of the plurality of target vertexes that form the target mesh region, therefore, the terminal can directly acquire the spatial coordinates of the origin of regional coordinates in the world coordinate system. Further, the terminal may determine the spatial coordinates of the sample key facial point based on the spatial coordinates of the origin of regional coordinates and the relative location.

In the foregoing embodiment, a relative location of the sample key facial point relative to the origin of regional coordinates in the world coordinate system can be accurately determined based on the spatial coordinates of each target vertex and the regional coordinates of the sample key facial point. Since the position of the regional coordinate origin in the world coordinate system is known, the spatial coordinates of the regional coordinate origin in the world coordinate system can be directly obtained. Further, based on the spatial coordinates and the relative locations of the regional coordinate origin, the spatial coordinates of the sample key facial point can be accurately determined, and the accuracy of the spatial coordinates of the sample key facial point can be further improved.

In an embodiment, the plurality of target vertexes are three target vertexes; and the determining a relative location of the sample key facial point relative to the origin of regional coordinates in the world coordinate system based on the spatial coordinates of each target vertex and the regional coordinates of the sample key facial point includes: determining a first space vector and a second space vector according to the spatial coordinates of each target vertex, the first space vector and the second space vector being vectors that point from the origin of regional coordinates to the other two target vertexes except the origin of regional coordinates; determining a first region vector and a second region vector according to the regional coordinates of the sample key facial point, a vector direction of the first region vector being consistent with a vector direction of the first space vector; a vector direction of the second region vector being consistent with a vector direction of the second space vector; determining a first conversion ratio based on the first space vector and the first region vector, and determining a second conversion ratio based on the second space vector and the second region vector; converting the first region vector according to the first conversion ratio to obtain a first intermediate vector, and converting the second region vector according to the second conversion ratio to obtain a second intermediate vector; and determining a relative location of the sample key facial point relative to the origin of regional coordinates in the world coordinate system based on the first intermediate vector and the second intermediate vector.

In an embodiment, the determining, by the terminal, a first conversion ratio based on the first space vector and the first region vector, and determining a second conversion ratio based on the second space vector and the second region vector includes: determining, by the terminal, the ratio of the first region vector to the first space vector as the first conversion ratio directly, and the ratio of the second region vector to the second space vector as the second conversion ratio directly.

In an embodiment, the determining, by the terminal, a relative location of the sample key facial point relative to the origin of regional coordinates in the world coordinate system based on the first intermediate vector and the second intermediate vector includes: adding, by the terminal, the first intermediate vector and the second intermediate vector, and directly determining the relative location of the sample key facial point relative to the regional coordinate origin in the world coordinate system based on the coordinates of the added vectors.

In the foregoing embodiment, according to the spatial coordinates of each target vertex, the first space vector and the second space vector can be directly determined. According to the regional coordinates of the sample key facial point, the first region vector and the second region vector can be directly determined. The first conversion ratio may be determined based on the first space vector and the first region vector, and the second conversion ratio may be determined based on the second space vector and the second region vector. The first intermediate vector can be obtained by converting the first region vector according to the first conversion ratio, and the second intermediate vector can be obtained converting the second region vector according to the second conversion ratio. Further, the relative location of the sample key facial point relative to the regional coordinate origin in the world coordinate system can be accurately determined based on the first intermediate vector and the second intermediate vector, thereby further improving the accuracy of the relative location of the sample key facial point relative to the origin of regional coordinates in the world coordinate system.

In an embodiment, the determining regional coordinates of the sample key facial point in the target mesh region includes: acquiring a key point index file, the key point index file recording a vertex identifier of each target vertex corresponding to each sample key facial point, and regional coordinates of the corresponding sample key facial point having a correspondence with the vertex identifier in the target mesh region; and searching, through the vertex identifier of each target vertex corresponding to the sample key facial point, the key point index file for the regional coordinates having a correspondence with the vertex identifier, to obtain the regional coordinates of the sample key facial point in the target mesh region.

The key point index file is a file that is adapted to find the regional coordinates of the sample key facial point in the target mesh region. The vertex identifier is a string that uniquely identifies the vertex.

Specifically, the user can mark the key facial point in the virtual face in the first expression, record the vertex identifier of the target vertex corresponding to the sample key facial point in the first expression in the key point index file, and records the regional coordinate binding of the corresponding sample key facial point in the target mesh region in the key point index file. The terminal can acquire the key point index file recorded by the user. Further, the terminal can search, through the vertex identifier of each target vertex corresponding to the sample key facial point, the key point index file for the regional coordinates having a correspondence with the vertex identifier, to obtain the regional coordinates of the sample key facial point in the target mesh region.

In an embodiment, the number of target vertexes is three, and the target mesh region is a triangular patch, the key point index file can be represented as Table 1 below:

TABLE 1

| Mesh name | Three target vertexes of the triangular patch where the key point is located | | | Coordinates of the key point in the triangular patch | |
|---|---|---|---|---|---|
| Name 1 | 1565 | 2286 | 2246 | 0.4207 | 0.2293 |
| . . . | | | | | |

It can be seen from the table that, for example, vertex identifiers of three target vertexes corresponding to a sample key facial point corresponding to a mesh named "Name 1" are respectively 1565, 2286, and 2246, and regional coordinates of the sample key facial point in the triangular patch are (0.4207, 0.2293).

In the foregoing embodiment, the key point index file is directly searched for the regional coordinates having a correspondence with the vertex identifier of the target vertex through the vertex identifier of the target vertex corresponding to the sample key facial point, to obtain the regional coordinates of the sample key facial point in the target mesh region, so as to improve the efficiency of acquiring the regional coordinates of the sample key facial point in the target mesh region, thereby further improving the expression generation efficiency.

In an embodiment, the controlling the associated vertex in the face mesh to move based on the target control parameter to generate the second expression in the virtual face includes: using the target control parameter as a control parameter of a target controller, the target controller having a binding relationship with each vertex of the face mesh of the virtual face; and controlling, through the target controller, the associated vertex in the face mesh to move based on the target control parameter to generate the second expression in the virtual face.

Specifically, the terminal may run the target controller, and the terminal may use the target control parameter as the control parameter of the target controller. Further, the terminal may control the associated vertex in the face mesh in the first expression to move based on the target control parameter through the target controller, thereby controlling the virtual face to be converted from the first expression to the second expression.

In an embodiment, as shown in FIG. 4, the main interface of the expression generation application further includes a "file" path, which is configured to store information about the controller. The user may select the target controller from a plurality of controllers stored in the "file" and bind the target controller to each vertex of the face mesh of the virtual face.

In an embodiment, as shown in FIG. 4, the main interface of the expression generation application further includes an "Auto Frame" button 402. By triggering the "Auto Frame" button 402, the terminal may automatically use the target control parameter as the control parameter of the target controller, and control the associated vertex in the face mesh in the first expression to move based on the target control parameter through the target controller, thereby controlling the virtual face to be converted from the first expression to the second expression.

In an embodiment, as shown in FIG. 11, the target controller has a binding relationship with each mesh vertex of the face mesh of the virtual face. It may be understood that the target controller can control the change of the position of the mesh vertex of the face mesh, so as to control the deformation of the face mesh to generate the corresponding expression.

Figure 12:
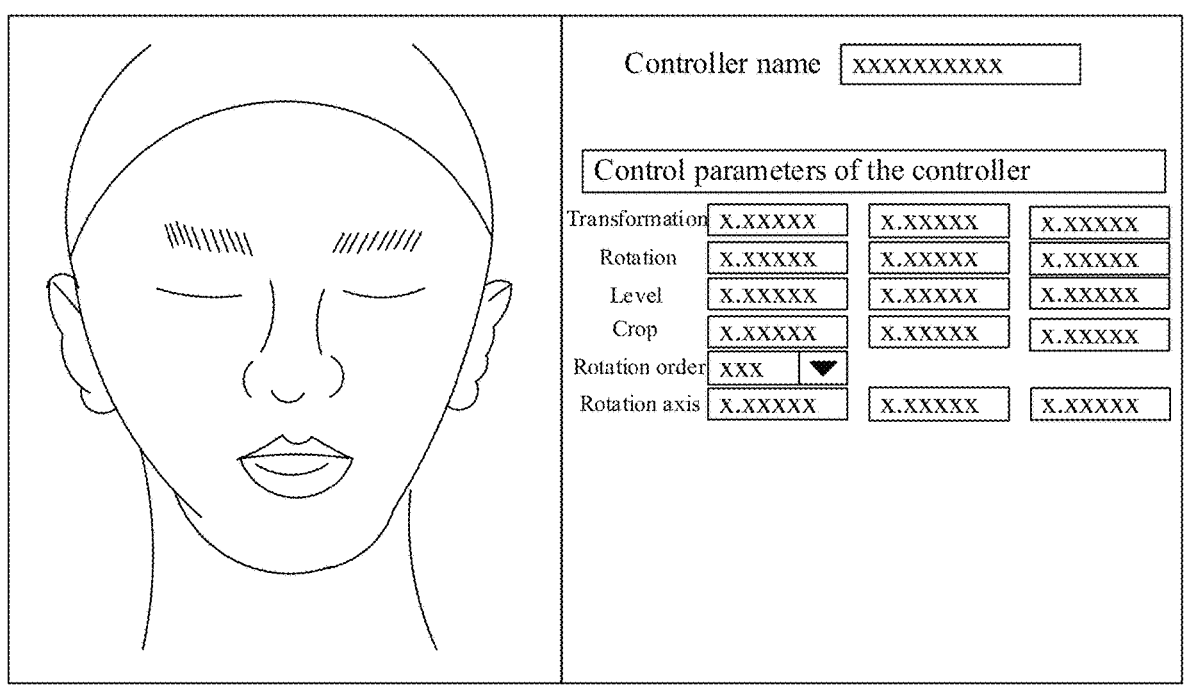
FIG. 12 is a schematic diagram of control parameter setting of a target controller according to an embodiment.

In an embodiment, the terminal can take the target control parameter as the control parameter of a target controller. To facilitate understanding of the controller, the controller is illustrated schematically in conjunction with FIG. 12. As shown in FIG. 12, the target controller may include a plurality of control parameters, such as a transition parameter, a rotation parameter, a grade parameter, a shear parameter, a rotation sequence parameter, a rotation axis parameter, and the like. The target control parameter may be the transition parameter in the target controller. The transition parameter is a parameter used for controlling the position of the associated vertex for mobile transition. It may be understood that the transition parameter can control the associated vertex to move to the corresponding position, so that the key facial point of the virtual face satisfies the corresponding key point distribution feature. Further, the terminal may control the associated vertex in the face mesh in the first expression to move based on the target control parameter through the target controller, thereby controlling the virtual face to be converted from the first expression to the second expression.

Figure 13:
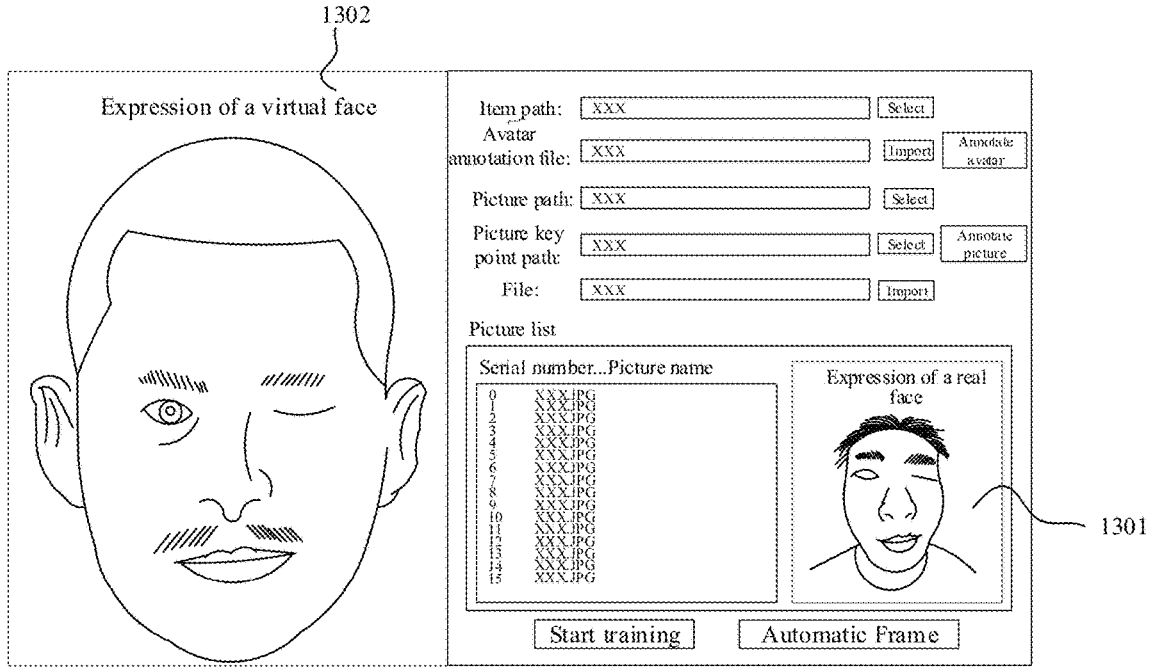
FIG. 13 is a schematic diagram of a finished virtual face made in a second expression according to an embodiment.

In an embodiment, referring to FIG. 13, the terminal can generate the second expression 1302 in the virtual face through the target controller based on the second expression 1301 of the real face. It may be understood that, for example, if the second expression is "wink", the terminal can generate the "wink" expression in the virtual face through the target controller based on the "wink" expression of the real face.

Further, in the foregoing embodiment, the target control parameter is directly used as the control parameter of the target controller, and then through the target controller, the associated vertex movement in the face mesh can be directly controlled based on the target control parameter, so as to generate the second expression in the virtual face, which further improves the expression generation efficiency.

Figure 14:
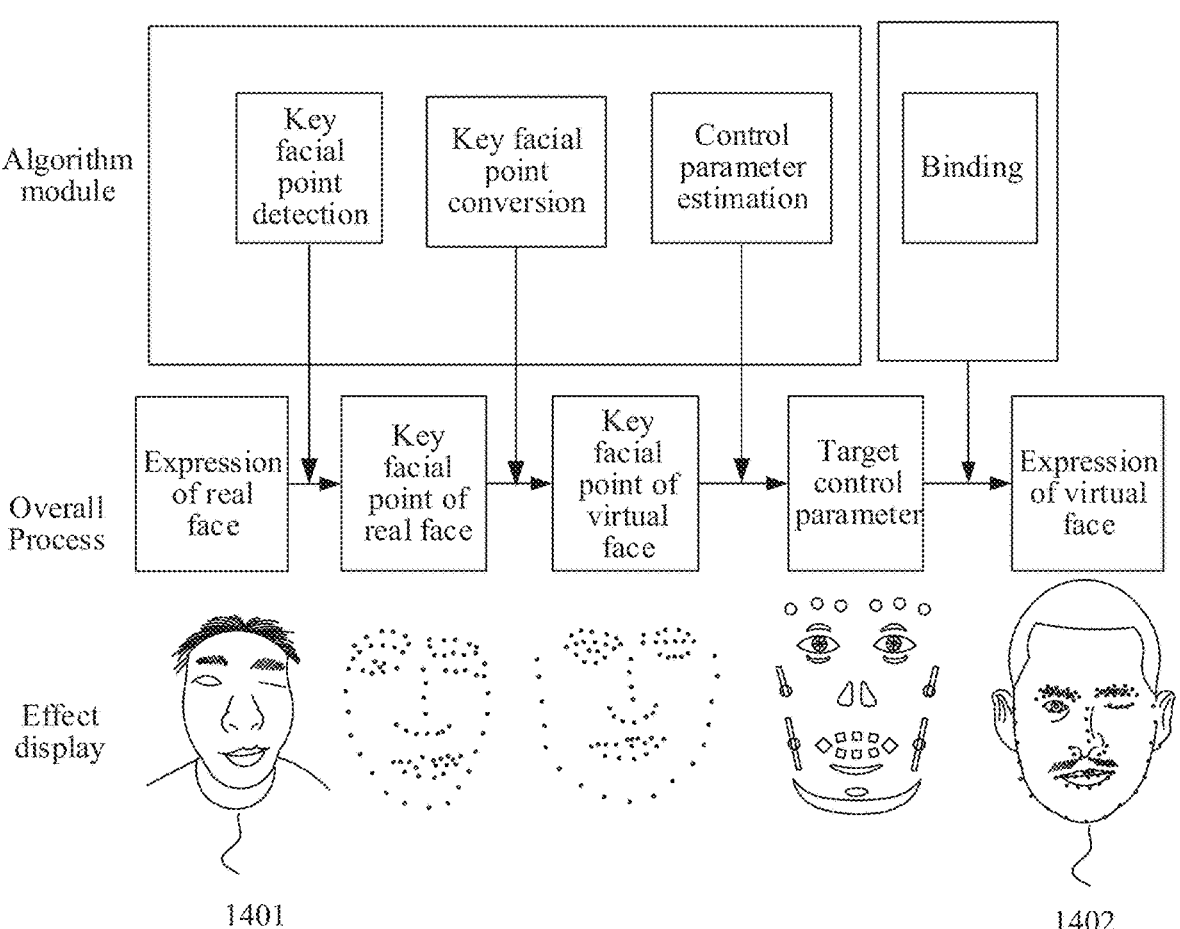
FIG. 14 is a schematic flowchart of an expression generation method according to another embodiment.

In an embodiment, as shown in FIG. 14, the terminal may acquire the first expression image of the real face in the first expression and the second expression image of the real face in the second expression (that is, an expression image 1401 of the real face). The terminal may locate the first location information of the key facial point of the real face in the first expression image and the second location information of the key facial point of the real face in the second expression image through the trained key point detection model (that is, the key facial point detection is performed to obtain the key facial point of the real face). The terminal may determine the difference between the first location information and the second location information to obtain the expression location difference information. The terminal may acquire a key facial point of a virtual face in the first expression to obtain an initial virtual key facial point. The terminal obtains a target virtual key facial point of the virtual face in the second expression based on the expression location difference information and the initial virtual key facial point (that is, the key facial point conversion is performed to obtain the key facial point of the virtual face in the second expression). The terminal may input the target virtual key facial point into the trained parameter estimation model for parameter estimation, and obtain the target control parameter. The terminal can take the target control parameter as the control parameter of the bound target controller. Through the target controller, the second expression (that is, the expression image of the virtual face 1402) can be generated based on the target control parameter.

Figure 15:
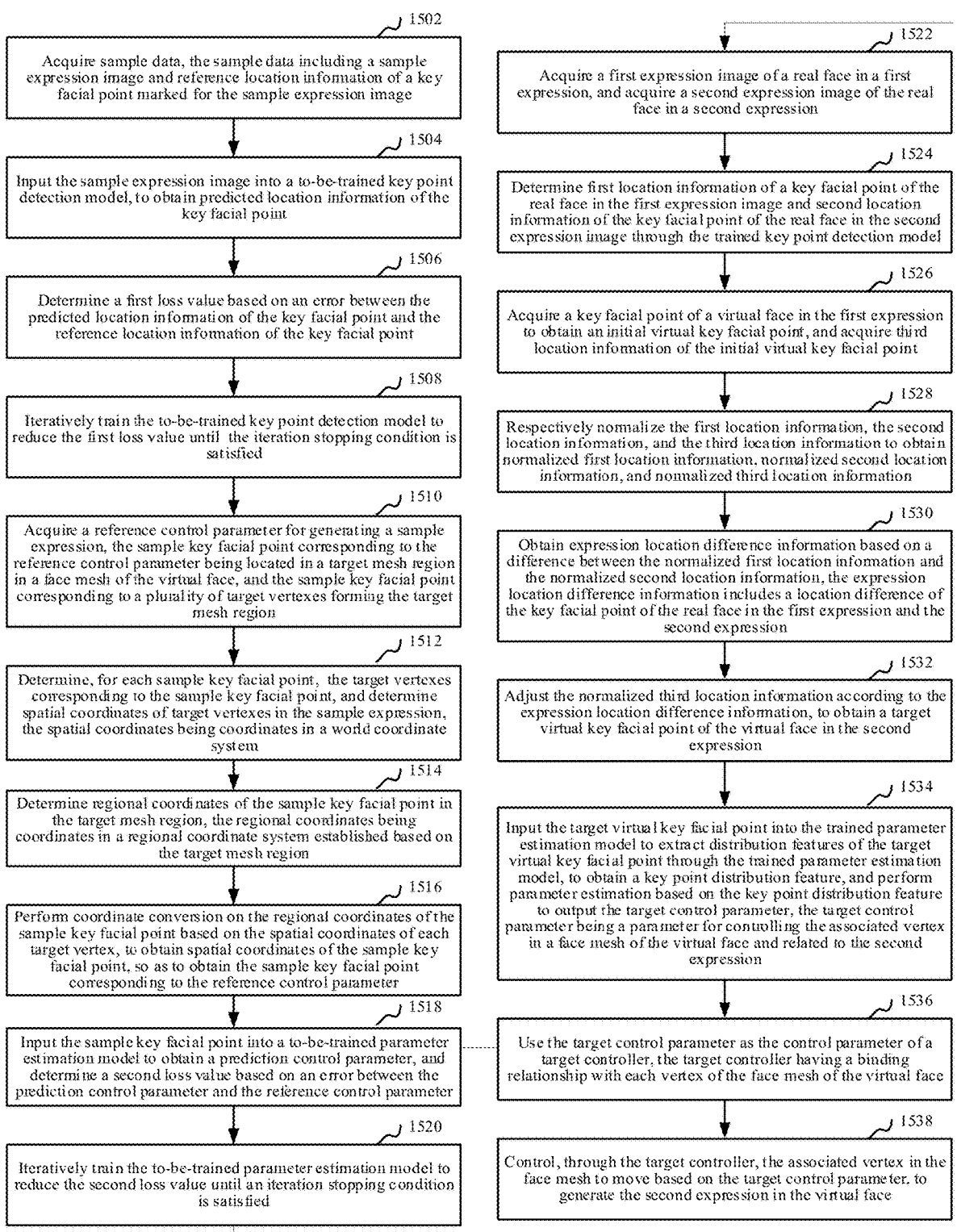
FIG. 15 is a schematic flowchart of an expression generation method according to still another embodiment.

As shown in FIG. 15, in an embodiment, an expression generation method is provided. The method specifically includes the following steps:

Step 1502: Acquire sample data, the sample data including a sample expression image and reference location information of the key facial point marked for the sample expression image.

Step 1504: Input the sample expression image into a to-be-trained key point detection model, to obtain predicted location information of the key facial point.

Step 1506: Determine a first loss value based on an error between the predicted location information of the key facial point and the reference location information of the key facial point.

Step 1508: Iteratively train the to-be-trained key point detection model to reduce the first loss value until an iteration stopping condition is satisfied, to obtain the trained key point detection model.

Step 1510: Acquire a reference control parameter for generating a sample expression, the sample key facial point corresponding to the reference control parameter being located in the target mesh region in the face mesh of the virtual face, and the sample key facial point corresponding to a plurality of target vertexes forming the target mesh region.

Step 1512: Determine, for the sample key facial point, the plurality of target vertexes corresponding to the sample key facial point, and determine spatial coordinates of the plurality of target vertexes in the sample expression, the spatial coordinates being coordinates in a world coordinate system.

Step 1514: Determine regional coordinates of the sample key facial point in the target mesh region, the regional coordinates being coordinates in a regional coordinate system established based on the target mesh region.

Step 1516: Perform coordinate conversion on the regional coordinates of the sample key facial point based on the spatial coordinates of the target vertexes, to obtain spatial coordinates of the sample key facial point, so as to obtain the sample key facial point corresponding to the reference control parameter.

Step 1518: Input the sample key facial point into a to-be-trained parameter estimation model to obtain a prediction control parameter, and determine a second loss value based on an error between the prediction control parameter and the reference control parameter.

Step 1520: Iteratively train the to-be-trained parameter estimation model to reduce the second loss value until an iteration stopping condition is satisfied, to obtain the trained parameter estimation model.

It should be noted that the present disclosure does not limit the training sequence of the parameter estimation model and the key point detection model.

Step 1522: Acquire a first expression image of the real face in the first expression;

and acquire a second expression image of the real face in the second expression.

Step 1524: Determine the first location information of the key facial point of the real face in the first expression image and the second location information of the key facial point of the real face in the second expression image through the trained key point detection model.

Step 1526: Acquire a key facial point of a virtual face in the first expression to obtain an initial virtual key facial point; and acquire third location information of the initial virtual key facial point.

Step 1528: Respectively normalize the first location information, the second location information, and the third location information to obtain normalized first location information, normalized second location information, and normalized third location information.

Step 1530: Obtain expression location difference information based on a difference between the normalized first location information and the normalized second location information, the expression location difference information includes a location difference of a key facial point of the real face in the first expression and the second expression.

Step 1532: Adjust the normalized third location information according to the expression location difference information, to obtain the target virtual key facial point of the virtual face in the second expression.

Step 1534: Input the target virtual key facial point into a trained parameter estimation model to extract distribution features of the target virtual key facial point through the trained parameter estimation model, to obtain a key point distribution feature, and perform parameter estimation based on the key point distribution feature to output the target control parameter, the target control parameter being a parameter for controlling associated vertex in a face mesh of the virtual face and related to the second expression.

Step 1536: Take the target control parameter as the control parameter of a target controller, the target controller having a binding relationship with each vertex of the face mesh of the virtual face.

Step 1538: Control, through the target controller, the associated vertex in the face mesh to move based on the target control parameter to generate the second expression in the virtual face.

The present disclosure further provides an application scenario. The foregoing expression generation method is applied to the application scenario. Specifically, the expression generation method may be applied to a 3D virtual character expression generation scenario in a game. A terminal may acquire sample data. The sample data includes a sample facial expression image and reference location information of a key facial point marked for the sample facial expression image. The sample facial expression image is inputted into a to-be-trained key facial point detection model, to obtain predicted location information of the key facial point. A first loss value is determined based on an error between the predicted location information of the key facial point and the reference location information of the key facial point. Iterative training is performed on the to-be-trained key facial point detection model to reduce the first loss value until the trained key facial point detection model is obtained in response to that an iteration stopping condition is satisfied.

The terminal may acquire a reference control parameter for generating a sample facial expression. The sample key facial point corresponding to the reference control parameter are located in the target mesh region in the face mesh of the virtual face. The sample key facial point corresponds to a plurality of target vertexes forming the target mesh region. Each target vertex corresponding to the sample key facial point and spatial coordinates of each target vertex in the sample facial expression are determined. The spatial coordinates are coordinates in a world coordinate system. Regional coordinates of the sample key facial point in the target mesh region are determined; and the regional coordinates are coordinates in a regional coordinate system established based on the target mesh region. Coordinate conversion is performed on the regional coordinates of the sample key facial point based on the spatial coordinates of each target vertex, to obtain spatial coordinates of the sample key facial point, so as to obtain the sample key facial point corresponding to the reference control parameter. The sample key facial point is inputted into a to-be-trained parameter estimation model to obtain a prediction control parameter. A second loss value is determined based on an error between the prediction control parameter and the reference control parameter. The to-be-trained parameter estimation model is iteratively trained to reduce the second loss value until a trained parameter estimation model is obtained in response to that an iteration stopping condition is satisfied.

The terminal may acquire a first expression image of a real face in a first expression, and acquire a second expression image of the real face in a second expression. First location information of the key facial point of the real face is located in the first expression image and second location information of the key facial point of the real face is located in the second expression image through the trained key facial point detection model. A key facial point of a virtual face in the first expression is acquired to obtain an initial virtual key facial point. Third location information of the initial virtual key facial point is acquired. The first location information, the second location information, and the third location information are respectively normalized to obtain normalized first location information, normalized second location information, and normalized third location information. expression location difference information is obtained based on a difference between the normalized first location information and the normalized second location information. The expression location difference information includes a location difference of a key facial point of the real face in the first expression and the second expression. The normalized third location information is adjusted according to the expression location difference information, to obtain a target virtual key facial point of the virtual face in the second expression.

The terminal may input the target virtual key facial point into a trained parameter estimation model, perform distribution feature extraction on the target virtual key facial point through the trained parameter estimation model to obtain a key point distribution feature, and perform parameter estimation based on the key point distribution feature to output the target control parameter, and the target control parameter is a parameter for controlling associated vertex in a face mesh of the virtual face and related to the second expression. The target control parameter is used as the control parameter of a target controller; and the target controller has a binding relationship with each vertex of the face mesh of the virtual face. Further, through the target controller, the movement of the associated vertex in the face mesh is controlled based on the target control parameter, to produce the second expression in the virtual face.

The present disclosure further provides an application scenario where the above expression generation method is applied. Specifically, the expression generation method may be applied to a virtual animal expression generation scene. The terminal may acquire expression location difference information based on a real animal face; and the expression location difference information includes a location difference of an animal key facial point of the real animal face in a first expression and a second expression. The animal key facial point of a virtual animal face in the first expression is acquired to obtain the initial virtual animal key facial point; and the virtual animal face is an animal face of a virtual object. The target virtual animal key facial point of the virtual animal face in the second expression are obtained based on the expression location difference information and the initial virtual animal key facial point. A key point distribution feature is extracted based on the target virtual animal key facial point and a target control parameter is determined based on the key point distribution feature; and the target control parameter is a parameter for controlling associated vertex in an animal face mesh of the virtual animal face and related to the second expression. The movement of the associated vertex in the animal face mesh is controlled based on the target control parameter to produce the second expression in the virtual animal face.

It is to be understood that, although the steps are displayed sequentially in the flowcharts of the embodiments, these steps are not necessarily performed sequentially according to the sequence. Unless otherwise explicitly specified in the present disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 16:
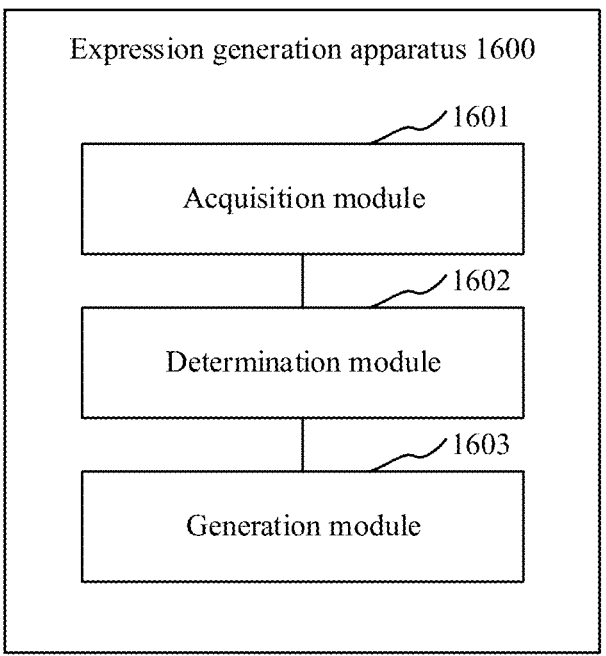
FIG. 16 is a structural block diagram of an expression generation apparatus according to an embodiment.

In an embodiment, as shown in FIG. 16, an expression generation apparatus 1600 is provided. The apparatus may include a software module, a hardware module, or a combination thereof to be incorporated as a part of a computer device. The apparatus specifically includes:

an acquisition module 1601, configured to acquire expression location difference information based on a real face, the expression location difference information including a location difference of a key facial point of the real face in a first expression and a second expression; and acquire the key facial point of a virtual face in the first expression to obtain an initial virtual key facial point, the virtual face being a face of a virtual object;

a determination module 1602, configured to obtain a target virtual key facial point of the virtual face in the second expression based on the expression location difference information and the initial virtual key facial point; and extract a key point distribution feature based on the target virtual key facial point and determine a target control parameter based on the key point distribution feature, the target control parameter being a parameter for controlling associated vertex in a face mesh of the virtual face and related to the second expression; and a generation module 1603, configured to control the associated vertex in the face mesh to move based on the target control parameter to generate the second expression in the virtual face.

In an embodiment, the acquisition module 1601 is further configured to: acquire a first expression image of the real face in the first expression; acquire a second expression image of the real face in the second expression; determine first location information of the key facial point of the real face in the first expression image; determine second location information of the key facial point of the real face in the second expression image; and determine a difference between the first location information and the second location information to obtain the expression location difference information.

In an embodiment, the first location information and the second location information are obtained by detecting a trained key point detection model; and the apparatus further includes:

a first training module 1604, configured to: acquire sample data, the sample data including a sample expression image and reference location information of the key facial point marked for the sample expression image; input the sample expression image into a to-be-trained key point detection model, to obtain predicted location information of the key facial point; determine a first loss value based on an error between the predicted location information of the key facial point and the reference location information of the key facial point; and iteratively train the to-be-trained key point detection model to reduce the first loss value until an iteration stopping condition is satisfied, to obtain the trained key point detection model.

In an embodiment, the acquisition module 1601 is further configured to acquire third location information of the initial virtual key facial point; respectively normalize the first location information, the second location information, and the third location information to obtain normalized first location information, normalized second location information, and normalized third location information; obtain expression location difference information based on a difference between the normalized first location information and the normalized second location information; and the determination module 1602 is further configured to adjust the normalized third location information according to the expression location difference information, to obtain the target virtual key facial point of the virtual face in the second expression.

In an embodiment, the acquisition module 1601 is further configured to: use the normalized location information as current location information in response to that each piece of the first location information, the second location information, and the third location information is normalized; determine, for each piece of current location information, a reference key facial point that satisfies a location stability condition; determine a reference point corresponding to the current location information based on the reference key facial point, and determine a relative distance between the reference key facial point and the reference point; determine a scaling ratio based on a distance between any two reference key facial points; and normalize the current location information according to the relative distance and the scaling ratio.

In an embodiment, the determination module 1602 is further configured to: adjust the normalized third location information according to the expression location difference information, to obtain intermediate state location information of the key facial point of the virtual face in the second expression; and perform inverse normalization on the intermediate state location information based on a relative distance and a scaling ratio corresponding to the third location information, to obtain the target virtual key facial point of the virtual face in the second expression.

In an embodiment, the determination module 1602 is further configured to input the target virtual key facial point into a trained parameter estimation model to extract distribution features of the target virtual key facial point through the trained parameter estimation model, to obtain a key point distribution feature, and perform parameter estimation based on the key point distribution feature to output the target control parameter.

In an embodiment, the apparatus further includes:

a second training module 1605, configured to acquire a reference control parameter for generating a sample expression; acquire a sample key facial point corresponding to the reference control parameter; input the sample key facial point into a to-be-trained parameter estimation model to obtain a prediction control parameter; determine a second loss value based on an error between the prediction control parameter and the reference control parameter; and iteratively train the to-be-trained parameter estimation model to reduce the second loss value until the trained parameter estimation model is obtained in response to that an iteration stopping condition is satisfied.

In an embodiment, the sample key facial point is located in a target mesh region of the face mesh; the sample key facial point corresponds to a plurality of target vertexes forming the target mesh region; the second training module 1605 is further configured to determine, for the sample key facial point, each of the target vertexes corresponding to the sample key facial point, and determine spatial coordinates of each target vertex in the sample expression, the spatial coordinates being coordinates in a world coordinate system; determine regional coordinates of the sample key facial point in the target mesh region, the regional coordinates being coordinates in a regional coordinate system established based on the target mesh region; and Perform coordinate conversion on the regional coordinates of the sample key facial point based on the spatial coordinates of each target vertex, to obtain spatial coordinates of the sample key facial point, so as to obtain the sample key facial point corresponding to the reference control parameter.

In an embodiment, the regional coordinate system is a coordinate system established by an origin of regional coordinates; the origin of regional coordinates is any one of the plurality of target vertexes forming the target mesh region; and the second training module 1605 is further configured to: determine a relative location of the sample key facial point relative to the origin of regional coordinates in the world coordinate system based on the spatial coordinates of each target vertex and the regional coordinates of the sample key facial point; acquire spatial coordinates of the origin of regional coordinates in the world coordinate system; and determine the spatial coordinates of the sample key facial point based on the spatial coordinates of the origin of regional coordinates and the relative location.

In an embodiment, the second training module 1605 is further configured to acquire a key point index file, the key point index file recording a vertex identifier of each target vertex corresponding to each sample key facial point, and regional coordinates of the corresponding sample key facial point having a correspondence with the vertex identifier in the target mesh region; and search, through the vertex identifier of each target vertex corresponding to the sample key facial point, the key point index file for the regional coordinates having a correspondence with the vertex identifier, to obtain the regional coordinates of the sample key facial point in the target mesh region.

In an embodiment, the generation module 1603 is further configured to: use the target control parameter as the control parameter of a target controller, the target controller having a binding relationship with each vertex of the face mesh of the virtual face; and control, through the target controller, the associated vertex in the face mesh to move based on the target control parameter to generate the second expression in the virtual face.

Figure 17:
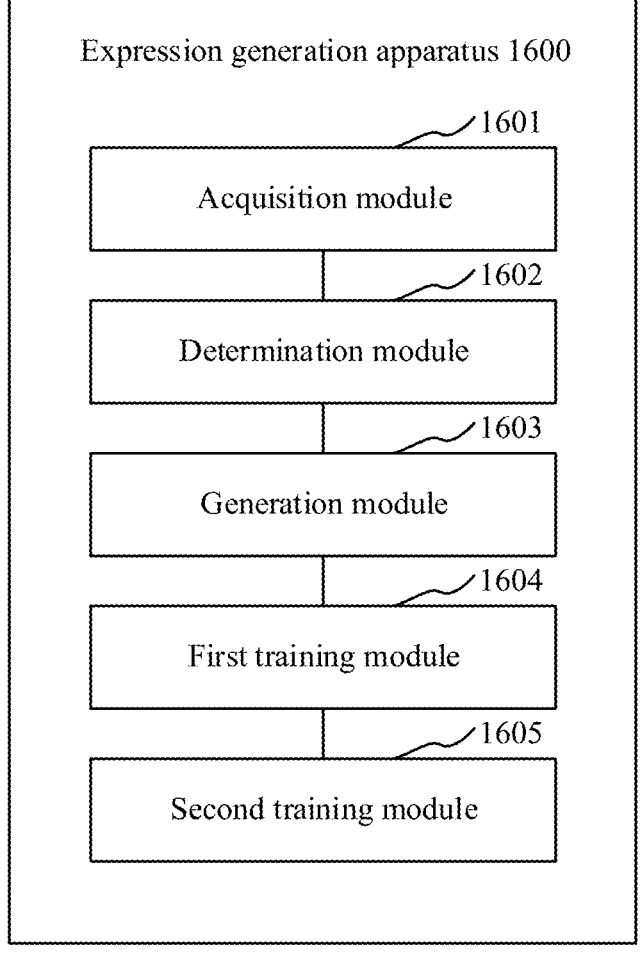
FIG. 17 is a structural block diagram of an expression generation apparatus according to another embodiment.

Referring to FIG. 17, in an embodiment, the expression generation apparatus 1600 may further include a first training module 1604 and a second training module 1605.

In the above expression generation apparatus, the expression location difference information obtained based on the real face is acquired. The expression location difference information may be used for representing a location difference of a key facial point of the real face in a first expression and a second expression. The key facial point of the virtual face in the first expression is acquired to obtain the initial virtual key facial point. The target virtual key facial point of the virtual face in the second expression may be acquired based on the expression location difference information and the initial virtual key facial point. A key point distribution feature may be extracted based on the target virtual key facial point, and the target control parameter can be quickly determined based on the key point distribution feature. The target control parameter is a parameter for controlling the associated vertex in the face mesh of the virtual face and related to the second expression. Further, the movement of the associated vertex in the face mesh is controlled based on the target control parameter, to produce the second expression in the virtual face. Compared with the expression generation method in related art, the expression generation method of the present disclosure can easily control the expression that produces a corresponding change in the virtual face, only by requiring to acquire the key facial point of the virtual face in the first expression and combining the key facial point of the real face with the expression location difference in a different expression, which improves the efficiency of expression generation.

For a specific limitation on the expression generation apparatus, reference may be made to the limitation on the expression generation method in the above, and the details are not described herein again. All or some of modules in the expression generation apparatus may be implemented by a software, a hardware, or a combination thereof. The foregoing modules may be built in or independent of a processor of a computer device in a form of hardware, or may be stored in a memory of the computer device in a form of software, so that the processor invokes and performs an operation corresponding to each of the foregoing modules.

In an embodiment, a computer device is provided. The computer device may be a terminal, and an internal structure diagram thereof may be shown in FIG. 18. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for execution of the operating system and the computer-readable instructions in the non-volatile storage medium. The communication interface of the computer device is used for wired or wireless communication with an external terminal. The wireless communication may be realized by Wi-Fi, an operator network, near field communication (NFC), or other technologies. The computer-readable instructions are executed to implement an expression generation method. The display screen of the computer device may be a liquid crystal display screen or an e-ink display screen. The input apparatus of the computer device may be a touch layer covering the display screen, or may be a button, a trackball, or a touch pad disposed on a housing of the computer device, or may be an external keyboard, touchpad, a mouse, or the like.

Figure 18:
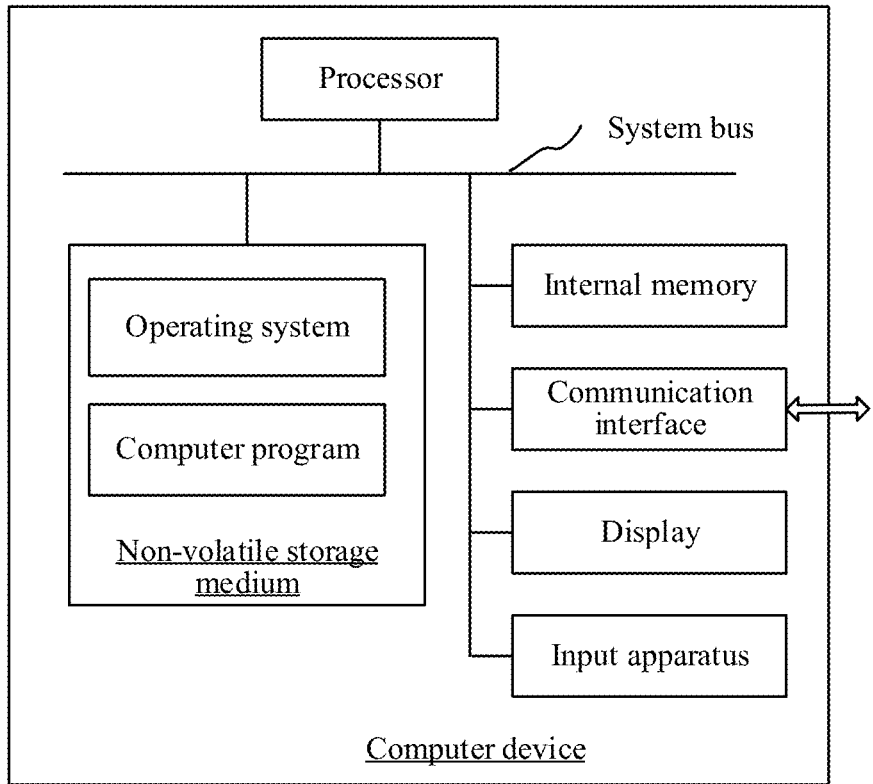
FIG. 18 is an internal structure diagram of a computer device according to an embodiment.

A person skilled in the art may understand that, the structure shown in FIG. 18 is merely a block diagram of a partial structure related to a solution in the present disclosure, and does not constitute a limitation to the computer device to which the solution in the present disclosure is applied. Specifically, the computer device may include more components or fewer components than those shown in the figure, or some components may be combined, or a different component deployment may be used.

In an embodiment, a computer device is further provided, including a memory and one or more processors. The memory stores computer-readable instructions. The one or more processors implement the operations in the foregoing method embodiments when executing the computer-readable instructions.

In an embodiment, one or more computer-readable storage media is provided, storing computer-readable instructions. The computer-readable instructions, when executed by one or more processors, implement the operations in the foregoing method embodiments.

In an embodiment, a computer program product is further provided, including computer-readable instructions. The computer-readable instructions, when executed by one or more processors, the operations in the foregoing method embodiments are implemented.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the foregoing method embodiments may be implemented. Any reference to the memory, storage, the database, or other media used in the embodiments provided in the present disclosure may include at least one of a non-volatile memory or a volatile memory. The non-volatile memory may include a read-only memory (ROM), a magnetic tape, a floppy disk, a flash memory, an optical memory, or the like. The non-volatile memory may further include a random access memory (RAM) or an external cache memory. By way of description and not limitation, the RAM may be in various forms, such as a static random access memory (SRAM), a dynamic random access memory (DRAM), or the like.

It should be noted that the user information (including but not limited to user device information, user personal information, and so on) and data (including but not limited to data for analysis, stored data, displayed data, and so on) involved in the present disclosure are all authorized by the user or information and data fully authorized by all parties. The collection, use, and processing of relevant data require to comply with relevant laws, regulations, and standards of relevant countries and regions.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present disclosure, which are described specifically and in detail, but cannot be construed as a limitation on the patent scope of the present disclosure. It should be noted that for a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. An expression generation method, applied to a terminal, the method comprising:
acquiring expression location difference information based on a real face, the expression location difference information including a location difference of a key facial point of the real face in a first expression and a second expression;
acquiring a key facial point of a virtual face in the first expression to obtain an initial virtual key facial point;
obtaining a target virtual key facial point of the virtual face in the second expression based on the expression location difference information and the initial virtual key facial point;
inputting the target virtual key facial point into a trained parameter estimation model to extract distribution features of the target virtual key facial point and to obtain a key point distribution feature, and performing parameter estimation based on the key point distribution feature to output a target control parameter, the target control parameter being a parameter for controlling an associated vertex in a face mesh of the virtual face and related to the second expression, the key point distribution feature indicating a distribution of the target virtual key facial point in the virtual face, the target control parameter having a binding relationship with the associated vertex of the face mesh of the virtual face, wherein the initial virtual key facial point has a corresponding relationship with the associated vertex, and a movement of the associated vertex is followed by a movement of the initial virtual key facial point of the virtual face; and
controlling the associated vertex in the face mesh to move based on the target control parameter, causing the corresponding initial virtual key facial point being controlled to move along with the associated vertex until a distribution of the moved initial virtual key facial point satisfies the key point distribution feature corresponding to the target virtual key facial point, to generate the second expression in the virtual face.

2. The method according to claim 1, wherein the acquiring expression location difference information based on a real face comprises:
acquiring a first expression image of the real face in the first expression;
acquiring a second expression image of the real face in the second expression;
determining first location information of the key facial point of the real face in the first expression image;
determining second location information of the key facial point of the real face in the second expression image; and
determining a difference between the first location information and the second location information to obtain the expression location difference information.

3. The method according to claim 2, wherein the first location information and the second location information are determined by using a trained key point detection model, and the trained key point detection model is obtained by:
acquiring sample data, the sample data comprising a sample expression image and reference location information of the key facial point marked for the sample expression image;
inputting the sample expression image into a key point detection model to be trained, to obtain predicted location information of the key facial point;
determining a first loss value based on an error between the predicted location information of the key facial point and the reference location information of the key facial point; and iteratively training the key point detection model to reduce the first loss value until an iteration stopping condition is satisfied, to obtain the trained key point detection model.

4. The method according to claim 2, further comprising:

acquiring third location information of the initial virtual key facial point;

respectively normalizing the first location information, the second location information, and the third location information to obtain normalized first location information, normalized second location information, and normalized third location information;

wherein the determining a difference between the first location information and the second location information to obtain the expression location difference information comprises:

obtaining the expression location difference information based on a difference between the normalized first location information and the normalized second location information; and the obtaining a target virtual key facial point of the virtual face in the second expression based on the expression location difference information and the initial virtual key facial point comprises:

adjusting the normalized third location information according to the expression location difference information, to obtain the target virtual key facial point of the virtual face in the second expression.

5. The method according to claim 4, wherein the respectively normalizing the first location information, the second location information, and the third location information comprises: for each location information of the first location information, the second location information, and the third location information:

using normalized location information as current location information;

determining, for the current location information, a reference key facial point that satisfies a location stability condition;

determining a reference point corresponding to the current location information based on the reference key facial point, and determining a relative distance between the reference key facial point and the reference point;

determining a scaling ratio based on a distance between any two reference key facial points; and normalizing the current location information according to the relative distance and the scaling ratio.

6. The method according to claim 5, wherein the location stability condition comprises at least one of:

a distance that a key facial point moves on a corresponding face in response to a switch occurs from a first expression to a second expression is less than a preset movement distance; or the key facial point does not move on the virtual face in response to switching from the first expression to the second expression.

7. The method according to claim 4, wherein the adjusting the normalized third location information according to the expression location difference information, to obtain the target virtual key facial point of the virtual face in the second expression comprises:

adjusting the normalized third location information according to the expression location difference information, to obtain intermediate state location information of the key facial point of the virtual face in the second expression; and performing inverse normalization on the intermediate state location information based on a relative distance and a scaling ratio corresponding to the third location information, to obtain the target virtual key facial point of the virtual face in the second expression.

8. The method according to claim 1, wherein the trained parameter estimation model is obtained by:

acquiring a reference control parameter for generating a sample expression;

acquiring a sample key facial point corresponding to the reference control parameter;

inputting the sample key facial point into a parameter estimation model to be trained to obtain a prediction control parameter;

determining a second loss value based on an error between the prediction control parameter and the reference control parameter; and iteratively training the parameter estimation model to reduce the second loss value until an iteration stopping condition is satisfied, to obtain the trained parameter estimation model.

9. The method according to claim 8, wherein the sample key facial point is located in a target mesh region of the face mesh; the sample key facial point corresponds to a plurality of target vertexes forming the target mesh region; and the acquiring a sample key facial point corresponding to the reference control parameter comprises:

determining, for the sample key facial point, the plurality of target vertexes corresponding to the sample key facial point, and determining spatial coordinates of the plurality of target vertexes in the sample expression, the spatial coordinates being coordinates in a world coordinate system;

determining regional coordinates of the sample key facial point in the target mesh region, the regional coordinates being coordinates in a regional coordinate system established based on the target mesh region; and performing coordinate conversion on the regional coordinates of the sample key facial point based on the spatial coordinates of the plurality of target vertexes, to obtain spatial coordinates of the sample key facial point corresponding to the reference control parameter.

10. The method according to claim 9, wherein the regional coordinate system is a coordinate system established based on an origin of regional coordinates, the origin of regional coordinates being one of the plurality of target vertexes forming the target mesh region; and the performing coordinate conversion on the regional coordinates of the sample key facial point based on the spatial coordinates of the plurality of target vertexes, to obtain spatial coordinates of the sample key facial point comprises:

determining a relative location of the sample key facial point relative to the origin of regional coordinates in the world coordinate system based on the spatial coordinates of the plurality of target vertexes and the regional coordinates of the sample key facial point;

acquiring spatial coordinates of the origin of regional coordinates in the world coordinate system; and determining the spatial coordinates of the sample key facial point based on the spatial coordinates of the origin of regional coordinates and the relative location.

11. The method according to claim 9, wherein the determining regional coordinates of the sample key facial point in the target mesh region comprises:

acquiring a key point index file, the key point index file recording vertex identifiers of target vertexes corresponding to the sample key facial point, and regional coordinates of the corresponding sample key facial point having a correspondence with the vertex identifiers in the target mesh region; and searching, through the vertex identifiers of the target vertexes corresponding to the sample key facial point, the key point index file for the regional coordinates having a correspondence with the vertex identifiers, to obtain the regional coordinates of the sample key facial point in the target mesh region.

12. The method according to claim 1, wherein the target control parameter comprises at least one of a transition parameter, a rotation parameter, a grade parameter, a shear parameter, a rotation sequence parameter, or a rotation axis parameter.

13. One or more non-transitory computer-readable storage media, storing computer-readable instructions, the computer-readable instructions, when executed by one or more processors, causing the one or more processors to implement the expression generation method according to claim 1.

14. An expression generation apparatus, comprising:

a memory and one or more processors, the memory storing computer-readable instructions, and the one or more processors, when executing the computer-readable instructions, implementing:

acquiring expression location difference information based on a real face, the expression location difference information including a location difference of a key facial point of the real face in a first expression and a second expression;

acquiring a key facial point of a virtual face in the first expression to obtain an initial virtual key facial point;

obtaining a target virtual key facial point of the virtual face in the second expression based on the expression location difference information and the initial virtual key facial point;

inputting the target virtual key facial point into a trained parameter estimation model to extract distribution features of the target virtual key facial point and to obtain a key point distribution feature, and performing parameter estimation based on the key point distribution feature to output a target control parameter, the target control parameter being a parameter for controlling an associated vertex in a face mesh of the virtual face and related to the second expression, the key point distribution feature indicating a distribution of the target virtual key facial point in the virtual face, the target control parameter having a binding relationship with the associated vertex of the face mesh of the virtual face, wherein the initial virtual key facial point has a corresponding relationship with the associated vertex, and a movement of the associated vertex is followed by a movement of the initial virtual key facial point of the virtual face; and controlling the associated vertex in the face mesh to move based on the target control parameter, causing the corresponding initial virtual key facial point being controlled to move along with the associated vertex until a distribution of the moved initial virtual key facial point satisfies the key point distribution feature corresponding to the target virtual key facial point, to generate the second expression in the virtual face.

15. The apparatus according to claim 14, wherein the acquiring expression location difference information based on a real face comprises:

acquiring a first expression image of the real face in the first expression;

acquiring a second expression image of the real face in the second expression;

determining first location information of the key facial point of the real face in the first expression image;

determining second location information of the key facial point of the real face in the second expression image; and determining a difference between the first location information and the second location information to obtain the expression location difference information.

16. The apparatus according to claim 15, wherein the first location information and the second location information are determined by using a trained key point detection model, and the trained key point detection model is obtained by:

acquiring sample data, the sample data comprising a sample expression image and reference location information of the key facial point marked for the sample expression image;

inputting the sample expression image into a key point detection model to be trained, to obtain predicted location information of the key facial point;

determining a first loss value based on an error between the predicted location information of the key facial point and the reference location information of the key facial point; and iteratively training the key point detection model to reduce the first loss value until an iteration stopping condition is satisfied, to obtain the trained key point detection model.

17. The apparatus according to claim 15, wherein the one or more processors are further configured to perform:

acquiring third location information of the initial virtual key facial point;

respectively normalizing the first location information, the second location information, and the third location information to obtain normalized first location information, normalized second location information, and normalized third location information;

wherein the determining a difference between the first location information and the second location information to obtain the expression location difference information comprises:

obtaining the expression location difference information based on a difference between the normalized first location information and the normalized second location information; and the obtaining a target virtual key facial point of the virtual face in the second expression based on the expression location difference information and the initial virtual key facial point comprises:

adjusting the normalized third location information according to the expression location difference information, to obtain the target virtual key facial point of the virtual face in the second expression.

18. The apparatus according to claim 17, wherein the respectively normalizing the first location information, the second location information, and the third location information comprises: for each location information of the first location information, the second location information, and the third location information:

using normalized location information as current location information;

determining, for the current location information, a reference key facial point that satisfies a location stability condition;

determining a reference point corresponding to the current location information based on the reference key facial point, and determining a relative distance between the reference key facial point and the reference point;

determining a scaling ratio based on a distance between any two reference key facial points; and normalizing the current location information according to the relative distance and the scaling ratio.

19. One or more non-transitory computer-readable storage media, storing computer-readable instructions, the computer-readable instructions, when executed by one or more processors, causing the one or more processors to implement:

acquiring a first expression image of a real face in a first expression and determining first location information of a key facial point of the real face in the first expression image;

acquiring a second expression image of the real face in a second expression and determining second location information of the key facial point of the real face in the second expression image;

acquiring a key facial point of a virtual face in the first expression to obtain an initial virtual key facial point;

acquiring third location information of the initial virtual key facial point;

respectively normalizing the first location information, the second location information, and the third location information to obtain normalized first location information, normalized second location information, and normalized third location information;

obtaining expression location difference information based on a difference between the normalized first location information and the normalized second location information;

adjusting the normalized third location information according to the expression location difference information, to obtain a target virtual key facial point of the virtual face in the second expression;

extracting a key point distribution feature based on the target virtual key facial point and determining a target control parameter based on the key point distribution feature, the target control parameter being a parameter for controlling an associated vertex in a face mesh of the virtual face and related to the second expression; and controlling the associated vertex in the face mesh to move based on the target control parameter to generate the second expression in the virtual face.

* * * * *